United States Patent
Nakashima et al.

(10) Patent No.: US 12,109,686 B2
(45) Date of Patent: Oct. 8, 2024

(54) CONTROL APPARATUS, CONTROL METHOD, AND COMPUTER-READABLE STORAGE MEDIUM STORING A CONTROL PROGRAM

(71) Applicant: OMRON Corporation, Kyoto (JP)

(72) Inventors: Chisato Nakashima, Kyoto (JP); Yoshiya Shibata, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 367 days.

(21) Appl. No.: 17/789,525

(22) PCT Filed: Jan. 16, 2020

(86) PCT No.: PCT/JP2020/001364
§ 371 (c)(1),
(2) Date: Jun. 28, 2022

(87) PCT Pub. No.: WO2021/144935
PCT Pub. Date: Jul. 22, 2021

(65) Prior Publication Data
US 2023/0064484 A1    Mar. 2, 2023

(51) Int. Cl.
*B25J 15/06* (2006.01)
*B23P 19/04* (2006.01)
(Continued)

(52) U.S. Cl.
CPC ............... *B25J 15/06* (2013.01); *B23P 19/04* (2013.01); *B23P 19/06* (2013.01); *B25J 13/08* (2013.01)

(58) Field of Classification Search
CPC . B25J 15/06; B25J 13/08; B25J 13/087; B25J 15/0616; B23P 19/04; B23P 19/06;
(Continued)

(56) References Cited

U.S. PATENT DOCUMENTS

2010/0004778 A1  1/2010  Arimatsu et al.
2011/0112713 A1  5/2011  Teng et al.
(Continued)

FOREIGN PATENT DOCUMENTS

CN  101618544 A  1/2010
CN  103158151 A  6/2013
(Continued)

OTHER PUBLICATIONS

An extended European search report issued on Mar. 30, 2023 in a counterpart European patent application.
(Continued)

*Primary Examiner* — Adam R Mott
*Assistant Examiner* — Alyzia N Dilworth
(74) *Attorney, Agent, or Firm* — METROLEX IP LAW GROUP, PLLC; Robert L. Scott, Esq.

(57) ABSTRACT

A control apparatus causes a robot device to move a suction head to a predetermined position at which a workpiece is fed and attempt to pick up the workpiece with the suction head at the predetermined position. Upon determining that the suction head has yet to pick up the workpiece, the control apparatus causes the robot device to rotationally move the suction head spirally in a horizontal direction while causing the suction head to perform a suction operation for the workpiece, and estimates a direction in which the workpiece is located with respect to the predetermined direction based on a change in compressed air pressure during the rotational movement of the suction head.

20 Claims, 8 Drawing Sheets

(51) Int. Cl.
    *B23P 19/06*    (2006.01)
    *B25J 13/08*    (2006.01)

(58) Field of Classification Search
    CPC ......... B23P 19/007; G05B 2219/39024; G05B 2219/39271; G05B 2219/40032
    See application file for complete search history.

(56) References Cited

U.S. PATENT DOCUMENTS

| | | |
|---|---|---|
| 2013/0158710 A1 | 6/2013 | Oda |
| 2016/0354928 A1 | 12/2016 | Shimodaira et al. |
| 2017/0028562 A1 | 2/2017 | Yamazaki et al. |
| 2017/0151666 A1 | 6/2017 | Kobayashi et al. |
| 2018/0338090 A1 | 11/2018 | Iida et al. |
| 2019/0232492 A1 | 8/2019 | Takeuchi |
| 2019/0329404 A1 | 10/2019 | Takeuchi |
| 2020/0254622 A1 | 8/2020 | Yamazaki et al. |
| 2023/0321837 A1 | 10/2023 | Yamazaki et al. |

FOREIGN PATENT DOCUMENTS

| | | | |
|---|---|---|---|
| CN | 105643267 A | | 6/2016 |
| CN | 106217373 A | | 12/2016 |
| CN | 106393102 A | | 2/2017 |
| CN | 106994680 A | | 8/2017 |
| CN | 108290257 A | | 7/2018 |
| CN | 108965690 A | | 12/2018 |
| CN | 109382828 A | | 2/2019 |
| CN | 110076751 A | | 8/2019 |
| CN | 110405729 A | | 11/2019 |
| DE | 34 20 330 C1 | | 12/1985 |
| JP | 5-72067 A | | 3/1993 |
| JP | 5-60735 U | | 8/1993 |
| JP | 2011218484 A | * | 11/2011 |
| JP | 2012-143842 A | | 8/2012 |
| JP | 2017-019100 A | | 1/2017 |
| JP | 2019-107737 A | | 7/2019 |
| WO | 2019107208 A1 | | 6/2019 |
| WO | 2019/215384 A1 | | 11/2019 |

OTHER PUBLICATIONS

Chinese Office Action issued on Dec. 6, 2023 in a counterpart Chinese patent application.
An English translation of the International Search Report ("ISR") of PCT/JP2020/001364 mailed on Mar. 17, 2020.
The Written Opinion("WO") of PCT/JP2020/001364 mailed on Mar. 17, 2020.

* cited by examiner

CONTROL APPARATUS, CONTROL METHOD, AND COMPUTER-READABLE STORAGE MEDIUM STORING A CONTROL PROGRAM

FIELD

The present disclosure relates to a control apparatus, a control method, and a computer-readable storage medium storing a control program.

BACKGROUND

Production lines and other product manufacturing processes may use robot devices that pick up a workpiece with a suction head and transfer the workpiece to an indented position. For such robot devices, an application is designed to allow a suction head to pick up a workpiece placed at a position slightly deviating from the position at which the workpiece is to be fed. However, any workpiece placed at a feeding position deviating beyond the allowable range cannot be picked up with the suction head. In this case, the robot device cannot hold the workpiece nor transfer the workpiece to an intended position.

Patent Literature 1 describes one method responding to this issue. More specifically, Patent Literature 1 describes a component transfer device including a suction head that picks up and holds a component with compressed air, a moving unit that moves the suction head, and an air pressure sensor that detects the pressure of the compressed air. The component transfer device moves the suction head to the position at which a component is fed, and then determines whether the suction head has picked up the component based on whether the output signal from the air pressure sensor has risen. Upon determining that the suction head has yet to pick up the component, the component transfer device reciprocates the suction head in two orthogonal horizontal directions (X-direction and Y-direction) from the feeding position to attempt to pick up the component with the suction head. This method allows the component transfer device to pick up and hold any component deviating from the feeding position in either of the two intersecting horizontal directions.

CITATION LIST

Patent Literature

Patent Literature 1: Japanese Unexamined Patent Application Publication No. 2011-218484

SUMMARY

The inventors have noticed issues described below associated with the known method described in, for example, Patent Literature 1. A workpiece may deviate from the feeding position in a direction other than the two intersecting horizontal directions. Any workpiece deviating in directions other than the two directions may not allow identification of the position at which the workpiece can be picked up. Once identifying a position at which the workpiece can be picked up, the known method stops searching for another position at which the workpiece can be picked up. The identified position is merely a local solution of a position for picking up the workpiece. The suction head may not stably pick up the workpiece at this position. For a relatively small suction head, in particular, any positional deviation of the workpiece can greatly affect the relative positional relationship between the suction head and the workpiece. Thus, these issues often result from any positional deviation.

Further, the known method uses a total of four search points in two horizontal intersecting directions from the feeding position to search for a position for picking up the workpiece. The suction head is first moved to one search point to determine whether the workpiece can be picked up at the search point. When the workpiece cannot be picked up, the suction head is returned to the feeding position and then moved to another search point. The suction head moves via the feeding position for every movement to another search point, taking more time and effort in the search for the position for picking up the workpiece.

Thus, the known method may not allow easy and appropriate estimation of the position at which the suction head can stably pick up any workpiece deviating from a predetermined position.

One or more embodiments are directed to a technique for easily and appropriately estimating the position at which the suction head may stably pick up a workpiece deviating from a predetermined position.

One or more embodiments may have the structures described below.

A control apparatus according to one or more embodiments is an apparatus for controlling a motion of a robot device. The robot device includes a suction head to pick up a workpiece using compressed air and a pressure sensor to detect pressure of the compressed air. The control apparatus includes a movement controller that causes the robot device to move the suction head to a predetermined position at which the workpiece is fed, a suction controller that causes the robot device to attempt to pick up the workpiece with the suction head at the predetermined position, a determiner that determines whether the suction head has picked up the workpiece in the attempt based on a detection result of the pressure of the compressed air from the pressure sensor, a searcher that causes, in response to determination that the suction head has yet to pick up the workpiece, the robot device to rotationally move the suction head spirally in a horizontal direction while causing the suction head to perform a suction operation for the workpiece using the compressed air, and an estimator that estimates a direction in which the workpiece is located with respect to the predetermined position based on a change in the pressure of the compressed air detected by the pressure sensor during the rotational movement of the suction head. In response to the determination that the suction head has yet to pick up the workpiece, the movement controller causes the robot device to further move the suction head in the estimated direction. After the suction head is further moved in the estimated direction, the suction controller causes the robot device to reattempt to pick up the workpiece with the suction head.

The control apparatus with the structure causes the robot device to move the suction head to the predetermined position at which the workpiece is fed and attempt to pick up the workpiece with the suction head at the predetermined position. In response to the suction head failing to pick up the workpiece in the attempt, the control apparatus with the structure causes the robot device to rotationally move the suction head spirally in the horizontal direction while causing the suction head to perform a suction operation for the workpiece to search for the true position of the workpiece. The rotational movement may be started from the predetermined position or from a position shifted from the predetermined position in any direction by any distance. The control apparatus with the structure then estimates the direction in which the workpiece is located with respect to the predetermined position based on a change in the compressed air pressure detected during the rotational movement of the suction head. The control apparatus with the structure then causes the robot device to further move the suction head in the estimated direction and reattempt to pick up the workpiece with the suction head at the position resulting from the movement. The distance by which the suction head is moved may be constant or determined based on the detection value of the pressure.

When the suction head picks up the workpiece, the compressed air pressure reaches the maximum. Thus, during the search, the suction head nearer the workpiece causes higher compressed air pressure, and the suction head farther from the workpiece causes lower compressed air pressure. The above estimation process thus allows appropriate estimation of the position of the workpiece. The suction head also turns once or more than once. The spiral rotational movement of the suction head thus allows searching for the workpiece in all directions of 360 degrees from the predetermined position. In other words, the control apparatus with the structure reduces (or possibly eliminates) the likelihood of any direction being unsearched for the workpiece unlike the method to perform searching in the two directions described above. The search for the workpiece is performed by controlling the relatively simple motion of the spiral rotational movement of the suction head. The control apparatus with the structure thus allows appropriate and easy estimation of the position at which the suction head can stably pick up any workpiece deviating from the predetermined position.

The spiral rotational movement reduces inefficient motions for the workpiece search, such as returning to a fixed position to search in a different direction. This allows relatively rapid identification of the position at which the workpiece can be picked up. The estimation result is used to move the suction head before the suction head reattempts to pick up the workpiece. This allows the suction head to stably hold the workpiece and the robot device to appropriately perform an intended task (process). This increases the productivity of the robot device.

The workpiece may be of any type that can be held by sucking and may be selected as appropriate in each embodiment. More specifically, the workpiece may be, for example, a screw or a washer. The robot device may be of any type that includes the suction head and the pressure sensor and may be selected as appropriate in each embodiment. More specifically, the robot device may be an industrial robot, such as a vertically articulated robot, a selective compliance assembly robot arm (SCARA) robot, a parallel link robot, a Cartesian coordinate robot, or a cooperative robot.

The suction head may be of any type that can pick up the workpiece with compressed air and may be selected as appropriate in each embodiment. The suction head may be, for example, elliptical, circular, or a multi-bellows head. The suction head may include a Coanda gripper. The suction head may be referred to as, for example, a suction pad or a vacuum pad. The pressure sensor may be of any type that can detect compressed air pressure and may be selected as appropriate in each embodiment. For example, the pressure sensor may include a known digital pressure sensor.

The spiral is a curve extending from the start position (central axis) of the search along an arc while increasing the diameter, or in other words, a curve extending away from the center (start position) as the curve turns. The start point may be at the predetermined position or at a position shifted from the predetermined position by any distance in any direction.

Rotationally moving the suction head spirally in the horizontal direction includes moving the suction head to describe a trajectory along a spiral on a horizontal plane as viewed in the vertical direction. During this rotational movement, the suction head may be maintained at a constant height, or moved vertically upward and downward, or more specifically, moved between various heights.

In the control apparatus according to one or more embodiments, the estimator may further estimate a distance between the predetermined position and a position of the workpiece based on a change in the pressure of the compressed air detected by the pressure sensor during the rotational movement of the suction head. In response to the determination that the suction head has yet to pick up the workpiece, the movement controller may cause the robot device to further move the suction head in the estimated direction by the estimated distance. After the suction head is further moved in the estimated direction by the estimated distance, the suction controller may cause the robot device to reattempt to pick up the workpiece with the suction head. This structure may allow more appropriate estimation of the position at which the suction head can stably pick up any workpiece deviating from the predetermined position.

In the control apparatus according to one or more embodiments, estimating the direction in which the workpiece is located may include dividing a trajectory of the rotational movement into a plurality of sections about an axis of the rotational movement, identifying, of the plurality of sections, a section with a highest pressure of the compressed air detected by the pressure sensor, and using a direction in which the identified section is located with respect to the predetermined position as the direction in which the workpiece is located. This structure may allow easier estimation of the position at which the suction head can stably pick up any workpiece deviating from the predetermined position.

In the control apparatus according to one or more embodiments, identifying the section with the highest pressure of the compressed air may include identifying a section including a detection point with a highest pressure of the compressed air detected by the pressure sensor or include calculating an average of pressure values of the compressed air detected by the pressure sensor for each of the plurality of sections and identifying, of the plurality of sections, a section with a greatest calculated average of the pressure. Each of the structures may allow appropriate estimation of the position at which the suction head can stably pick up any workpiece deviating from the predetermined position.

In the control apparatus according to one or more embodiments, the spiral rotational movement may include a plurality of turns each with a different diameter. The estimator may further estimate a distance between the predetermined position and a position of the workpiece based on comparison between pressure values of the compressed air detected by the pressure sensor in different turns of the plurality of turns in the identified section. In response to the determination that the suction head has yet to pick up the workpiece, the movement controller may cause the robot device to further move the suction head in the estimated direction by the estimated distance. After the suction head is further moved in the estimated direction by the estimated distance, the suction controller may cause the robot device to reattempt to pick up the workpiece with the suction head. This structure may allow more appropriate estimation of the position at which the suction head can stably pick up any workpiece deviating from the predetermined position.

In the control apparatus according to one or more embodiments, comparison between the pressure values of the compressed air detected in the different turns may include identifying, of the plurality of turns, a turn with a highest pressure of the compressed air detected by the pressure sensor in the identified section. The estimator may estimate the distance between the predetermined position and the position of the workpiece based on the diameter of the identified turn. This structure may allow more appropriate estimation of the position at which the suction head can stably pick up any workpiece deviating from the predetermined position.

In the control apparatus according to one or more embodiments, estimating the direction in which the workpiece is located may include identifying a detection point with a highest pressure of the compressed air detected by the pressure sensor, and using a direction in which the identified detection point is located with respect to the predetermined position as the direction in which the workpiece is located. This structure may allow appropriate and easy estimation of the position at which the suction head can stably pick up any workpiece deviating from the predetermined position.

In the control apparatus according to one or more embodiments, the spiral rotational movement may include a plurality of turns each with a different diameter. The estimator may further estimate a distance between the predetermined position and a position of the workpiece based on a distance between the predetermined position and the identified detection point. In response to the determination that the suction head has yet to pick up the workpiece, the movement controller may cause the robot device to further move the suction head in the estimated direction by the estimated distance. After the suction head is further moved in the estimated direction by the estimated distance, the suction controller may cause the robot device to reattempt to pick up the workpiece with the suction head. A spiral including one turn may include any point with further higher pressure. Thus, the detection point with the maximum pressure in the search may not be the optimal position for picking up the workpiece. The structure including the multiple turns with different diameters may reduce the likelihood of any detection point with higher pressure left unsearched. This may allow more appropriate estimation of the position at which the suction head can stably pick up any workpiece deviating from the predetermined position. In this case, the distance between the predetermined position and the detection point may be directly used as the estimated distance.

The control apparatus according to one or more embodiments may further include a calibrator that calibrates the detection result of the pressure of the compressed air from the pressure sensor. The searcher may cause the robot device to further displace the suction head vertically while causing the suction head to rotationally move spirally in the horizontal direction Calibrating the detection result may include eliminating a difference between variations in pressure of the compressed air detected by the pressure sensor during the vertical displacement of the suction head and variations in pressure of the compressed air expected based on the vertical displacement of the suction head. The estimator may use a calibrated result to estimate the direction in which the workpiece is located with respect to the predetermined position.

The detection result (detection value) of the pressure detected by the pressure sensor may be delayed on a time axis from the point of search with the suction head. Without such a difference on the time axis between the point at which the pressure detection result is obtained and the search point, the suction head moved in the vertical direction is expected to cause the greatest pressure detection value (local maximum) at its lowest point and cause the least pressure detection value (local minimum) at its highest point. When the pressure detection result is delayed from the search point, the pressure detection value reaches the local maximum at a time delayed from the time point at which the suction head reaches the lowest point. Similarly, the pressure detection value reaches the local minimum at a time delayed from the time point at which the suction head reaches the highest point. The structure including the calibration process may eliminate the difference. The structure thus may allow more appropriate estimation of the position at which the suction head can stably pick up any workpiece deviating from the predetermined position.

In the control apparatus according to one or more embodiments, the workpiece may include a screw. The robot device may further include a screwdriver to rotate the screw sucked to the suction head about an axis of the screw. The structure may increase the productivity of the robot device that performs the process of turning screws.

Another implementation of the control apparatus according to one or more embodiments may be an information processing method, a program, or a storage medium storing the program readable by, for example, a computer for implementing the components described above. The computer-readable storage medium herein includes a medium storing a program or other information in an electrical, magnetic, optical, mechanical, or chemical manner. A robotic system in one or more embodiments may include the control apparatus and the robot device according to any of the above aspects.

For example, a control method according to one or more embodiments is an information processing method for a motion of a robot device. The robot device includes a suction head to pick up a workpiece using compressed air and a pressure sensor to detect pressure of the compressed air. The method is implementable by a computer. The method includes causing the robot device to move the suction head to a predetermined position at which the workpiece is fed, causing the robot device to attempt to pick up the workpiece with the suction head at the predetermined position, determining whether the suction head has picked up the workpiece in the attempt based on a detection result of the pressure of the compressed air from the pressure sensor, in response to determination that the suction head has yet to pick up the workpiece, causing the robot device to rotationally move the suction head spirally in a horizontal direction while causing the suction head to perform a suction operation for the workpiece using the compressed air, estimating a direction in which the workpiece is located with respect to the predetermined position based on a change in the pressure of the compressed air detected by the pressure sensor during the rotational movement of the suction head, causing the robot device to further move the suction head in the estimated direction, and causing, after further moving the suction head in the estimated direction, the robot device to reattempt to pick up the workpiece with the suction head.

For example, a computer-readable storage medium storing a control program according to one or more embodiments is a computer-readable storage medium storing a program for controlling a motion of a robot device. The robot device includes a suction head to pick up a workpiece using compressed air and a pressure sensor to detect pressure of the compressed air. The control program causes a computer to perform operations including causing the robot device to move the suction head to a predetermined position at which the workpiece is fed, causing the robot device to attempt to pick up the workpiece with the suction head at the predetermined position, determining whether the suction head has picked up the workpiece in the attempt based on a detection result of the pressure of the compressed air from the pressure sensor, in response to determination that the suction head has yet to pick up the workpiece, causing the robot device to rotationally move the suction head spirally in a horizontal direction while causing the suction head to perform a suction operation for the workpiece using the compressed air, estimating a direction in which the workpiece is located with respect to the predetermined position based on a change in the pressure of the compressed air detected by the pressure sensor during the rotational movement of the suction head, causing the robot device to further move the suction head in the estimated direction, and causing, after further moving the suction head in the estimated direction, the robot device to reattempt to pick up the workpiece with the suction head.

The structures according to one or more embodiments may allow appropriate and easy estimation of the position at which the suction head may stably pick up any workpiece deviating from the predetermined position.

DETAILED DESCRIPTION

An embodiment of the present invention (hereafter, the present embodiment) will now be described with reference to the drawings. The present embodiment described below is a mere example of the present invention in all aspects. The embodiment may be variously modified or altered without departing from the scope of the present invention. More specifically, the present invention may be implemented as appropriate using the configuration specific to each embodiment. Although data used in the present embodiment is described in a natural language, such data may be specifically defined using any computer-readable language, such as a pseudo language, commands, parameters, or a machine language.

1. Example Use

Figure 1:
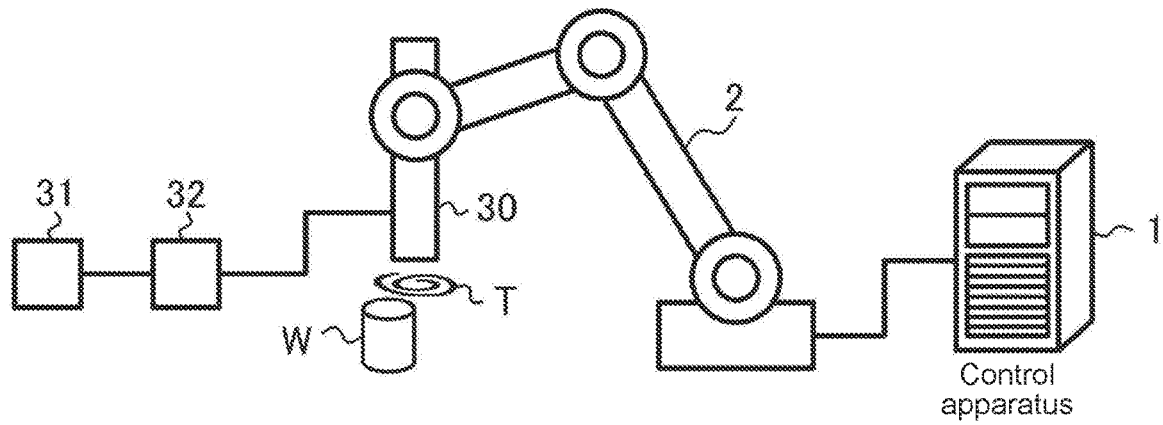
FIG. 1 is a schematic diagram illustrating a structure according to one or more embodiments used in one example situation.

One example use of a structure according to one embodiment of the present invention will now be described with reference to FIG. 1. FIG. 1 is a schematic diagram of a robotic system in the present embodiment used in one example situation. As shown in FIG. 1, the robotic system in the present embodiment includes a control apparatus 1 and a robot device 2.

The robot device 2 in the present embodiment grips a workpiece W by suction and transports the gripping workpiece W to an intended position. More specifically, the robot device 2 in the present embodiment includes a suction head 30, a compressor 31, and a pressure sensor 32.

The suction head 30 uses compressed air to pick up the workpiece W. The suction head 30 may be of any type that can pick up the workpiece W with compressed air and may be selected as appropriate in each embodiment. The suction head 30 may be, for example, elliptical, circular, or a multi-bellows head. The suction head 30 may include a Coanda gripper. The suction head 30 may be referred to as, for example, a suction head or a vacuum pad.

The compressor 31 supplies compressed air to the suction head 30. Compressed air may be supplied to the suction head 30 in other manners. Instead of the compressor 31, a vacuum pump may be used, for example. The structure for sucking including the compressor 31 may include, for example, known vacuum generators and vacuum regulators.

The pressure sensor 32 detects the pressure of compressed air. The pressure sensor 32 provides detection values of compressed air pressure. The pressure sensor 32 may be of any type that can detect compressed air pressure and may be selected as appropriate in each embodiment. For example, the pressure sensor 32 may include a known digital pressure sensor.

In the example in FIG. 1, the pressure sensor 32 is installed on the path connecting the compressor 31 to the suction head 30. However, the pressure sensor 32 may be installed at any other positions at which the pressure of the compressed air acting on the suction head 30 can be detected. The position may be determined as appropriate in each embodiment.

The control apparatus 1 according to the present embodiment includes a computer that controls the motion of the robot device 2. More specifically, the control apparatus 1 according to the present embodiment causes the robot device 2 to move the suction head 30 to a predetermined position at which the workpiece W is fed and attempt to pick up the workpiece W with the suction head 30 at the predetermined position. The control apparatus 1 according to the present embodiment determines, based on the detection result of the compressed air pressure from the pressure sensor 32, whether the suction head 30 has picked up the workpiece W in the attempt.

A workpiece W positioned accurately at the predetermined position can be picked up with the suction head 30. Upon determining that the suction head 30 has picked up the workpiece W based on the pressure detection result, the control apparatus 1 causes the robot device 2 to perform the motion in the next process, such as transporting the workpiece W held by the suction head 30 to an intended position. The motion in the next process may be any motion determined as appropriate in each embodiment.

A workpiece W greatly deviating from the predetermined position cannot be picked up with the suction head 30. Upon determining that the suction head 30 has yet to pick up the workpiece W based on the pressure detection result, the control apparatus 1 causes the robot device 2 to rotationally move the suction head 30 spirally in the horizontal direction while causing the suction head 30 to perform a suction operation for the workpiece W using compressed air. The control apparatus 1 thus searches for the true position of the workpiece W while causing the suction head 30 to rotationally move along a spiral trajectory T. The control apparatus 1 with the structure estimates the direction in which the workpiece W is located with respect to the predetermined position based on a change in the compressed air pressure detected during the rotational movement of the suction head 30. Upon determining that the suction head 30 has yet to pick up the workpiece W, the control apparatus 1 causes the robot device 2 to further move the suction head 30 in the estimated direction. After moving the suction head 30 further in the estimated direction, the control apparatus 1 causes the robot device 2 to reattempt to pick up the workpiece W with the suction head 30.

Figure 2:
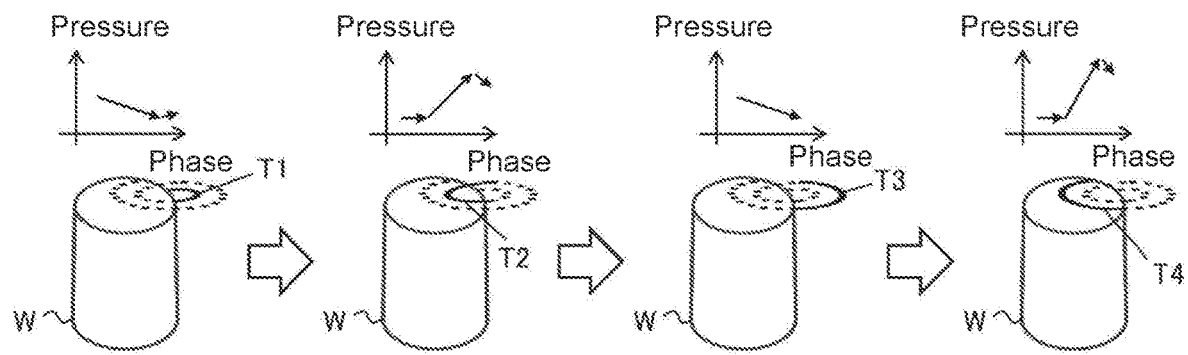
FIG. 2 is diagram illustrating an example relationship between a trajectory of a suction head and a pressure of compressed air during a search.

With reference to FIG. 2, the relationship between the change in the detection values of compressed air pressure and the direction in which the workpiece W is estimated to be located is described. FIG. 2 schematically describes an example relationship between the trajectory T of the suction head 30 and the detection values of the compressed air pressure during the search with the rotational movement. For ease of explanation, the right of the page is referred to as right, the left as left, the back as front, and the front as rear in the example described below.

In the example in FIGS. 1 and 2, the suction head 30 approaches the workpiece W from above and picks up the workpiece W on the upper surface of the workpiece W. In the example, the upper surface of the workpiece W is circular. The suction head 30 can pick up the workpiece W more stably nearer the center. In the example, the workpiece W is at a position deviating leftward to the rear from the predetermined position (the position of the suction head 30). Thus, the suction head 30 cannot pick up the workpiece W in the pickup attempt at the predetermined position.

The control apparatus 1 causes the robot device 2 to rotationally move the suction head 30 spirally in the horizontal direction. The spiral is a curve extending from the start point for the search as a central axis along an arc while increasing the diameter from the start point, or in other words, a curve extending away from the center as the curve turns. The control apparatus 1 causes the robot device 2 to rotationally move the suction head 30 along the spiral trajectory T. The rotational movement may include any number of turns, which may be determined as appropriate in each embodiment.

In the example in FIG. 2, the rotational movement includes two turns. In other words, the spiral rotational movement includes two turns each with a different system. In this example, the trajectory T resulting from the two turns can be divided into four partial trajectories T1 to T4 based on whether the suction head 30 is near the workpiece W during the rotational movement. In the example in FIG. 2, for ease of explanation, the suction head 30 being near the workpiece W is in the space above the workpiece W. The partial trajectories T2 and T4 correspond to the periods in which the suction head 30 is near the workpiece W, and the partial trajectories T1 and T3 correspond to the periods in which the suction head 30 is not near the workpiece W.

In the period for the first partial trajectory T1, the suction head 30 moves from the start point of the search to near the workpiece W. During this period, the suction head 30 is not near the workpiece W. Thus, the detection value of the compressed air pressure obtained with the pressure sensor 32 does not reach a large value (local maximum). When the suction head 30 moves away from the workpiece W, the pressure detection value decreases. When the suction head 30 is nearest the center of the workpiece W, the pressure detection value reaches the local maximum. As the suction head 30 moves nearer the workpiece W, the pressure detection value increases gradually from a less value.

In the period for the following partial trajectory T2, the suction head 30 moves near the workpiece W for the first time. During this period, the suction head 30 is near the workpiece W. Thus, the detection value of the compressed air pressure obtained with the pressure sensor 32 reaches a relatively large value. In particular, as the suction head 30 moves nearer the center of the workpiece W from the edge, the pressure detection value increases. When the suction head 30 is nearest the center of the workpiece W, the pressure detection value reaches the local maximum. As the suction head 30 moves away from around the center of the workpiece W toward the edge, the pressure detection value decreases.

In the period for the following partial trajectory T3, the suction head 30, which is once near the workpiece W, moves away from the workpiece W. The detection values of the compressed air pressure obtained with the pressure sensor 32 during this period vary in the same manner as the detection values obtained in the period for the partial trajectory T1. The pressure detection value does not reach a great value. When the suction head 30 moves away from the workpiece W, the pressure detection value decreases. When the suction head 30 is farthest from the workpiece W, the pressure detection value reaches the local minimum. As the suction head 30 moves nearer the workpiece W, the pressure detection value increases gradually from a less value.

In the period for the following partial trajectory T4, the suction head 30 moves near the workpiece W for the second time. The detection values of the compressed air pressure obtained with the pressure sensor 32 during this period vary generally in the same manner as the detection values obtained in the period for the partial trajectory T2. As the suction head 30 moves nearer the center of the workpiece W from the edge, the pressure detection value increases. When the suction head 30 is nearest the center of the workpiece W, the pressure detection value reaches the local maximum. As the suction head 30 moves away from around the center of the workpiece W toward the edge, the pressure detection value decreases.

The suction head 30, which moves rotationally in a spiral shape, turns with different diameters between the partial trajectory T2 and the partial trajectory T4. Thus, the suction head 30 comes near the center of the workpiece W by a different degree between the period for the partial trajectory T2 and the period for the partial trajectory T4. In the period in which the suction head 30 is nearer the center, the pressure detection value is greater. For example, the suction head 30 is nearer the center of the workpiece W in the period for the partial trajectory T4 than in the period for the partial trajectory T2. In this case, the local maximum of the pressure detected in the period for the partial trajectory T4 is greater than the local maximum of the pressure detected in the period for the partial trajectory T2.

In this manner, during the search with the rotational movement, the suction head 30 nearer the workpiece W causes higher pressure of the compressed air detected by the pressure sensor 32, and the suction head 30 farther from the workpiece W causes lower pressure of the compressed air detected by the pressure sensor 32. More specifically, as shown in FIG. 2, the workpiece W is located, with respect to the start point of the search, in the direction of the phase in which the pressure detection value increases. The control apparatus 1 can thus appropriately estimate the direction in which the workpiece W is located with respect to the predetermined position based on the change in the compressed air pressure detected during the rotational movement of the suction head 30.

As shown in FIG. 2, the suction head 30 also turns once or more than once to move rotationally in a spiral shape. The suction head 30 can thus search for the workpiece W in all directions of 360 degrees from the predetermined position. In other words, the structure in the present embodiment reduces (possibly eliminates) the likelihood of any direction with respect to the predetermined position being unsearched for the workpiece W. The search for the workpiece W is performed by controlling the relatively simple motion of the spiral rotational movement of the suction head 30. The structure in the present embodiment thus allows easy and appropriate estimation of the position at which the suction head 30 can stably pick up any workpiece W deviating from the predetermined position.

The spiral rotational movement reduces inefficient motions for the workpiece search, such as returning to a fixed position to search in a different direction. This allows relatively rapid identification of the position at which the workpiece W can be picked up. The control apparatus 1 according to the present embodiment further moves the suction head 30 using the estimation result from the search before causing the robot device 2 to reattempt to pick up the workpiece W with the suction head 30. This allows the suction head 30 to stably hold the workpiece W and causes the robot device 2 to perform an intended task (process) appropriately. The robot device 2 can thus have higher productivity.

2. Example Structure

Hardware Configuration
Control Apparatus

Figure 3:
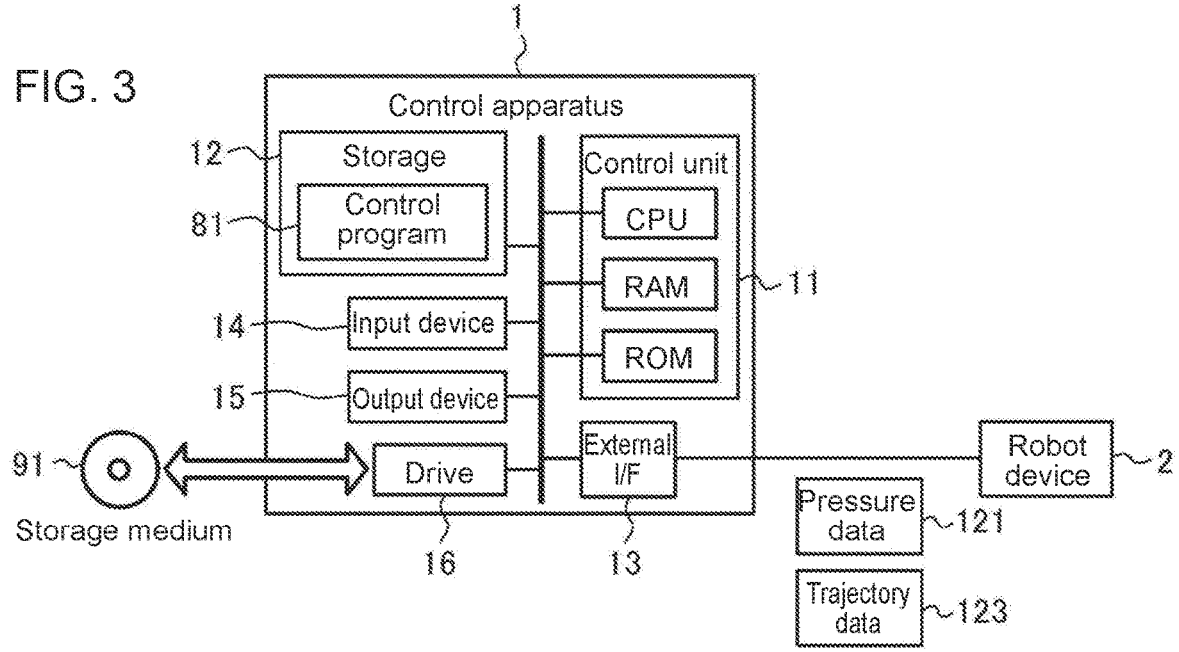
FIG. 3 is a schematic diagram illustrating a control apparatus according to one or more embodiments showing an example hardware configuration.

The hardware configuration of the control apparatus 1 according to the present embodiment will now be described with reference to FIG. 3. FIG. 3 is a schematic diagram of the control apparatus 1 according to the present embodiment showing its example hardware configuration.

As shown in FIG. 3, the control apparatus 1 according to the present embodiment is a computer including a control unit 11, a storage 12, an external interface 13, an input device 14, an output device 15, and a drive 16 that are electrically connected to one another. In FIG. 3, the external interface is abbreviated as an external I/F.

The control unit 11 includes, for example, a central processing unit (CPU) as a hardware processor, a random-access memory (RAM), and a read-only memory (ROM). The control unit 11 performs information processing based on programs and various items of data. The storage 12, as an example of a memory, includes, for example, a hard disk drive or a solid-state drive. In the present embodiment, the storage 12 stores various items of information including a control program 81.

The control program 81 causes the control apparatus 1 to perform information processing described later (FIG. 7) for the control over the motion of the robot device 2. The control program 81 includes a series of commands for the information processing. This will be described in detail later.

The external interface 13 is an interface for connection to an external device and may be, for example, a universal serial bus (USB) port or a dedicated port. The type and the number of external interfaces 13 may be selected as appropriate for the type and the number of external devices to be connected. In the present embodiment, the control apparatus 1 is connected to the robot device 2 through the external interface 13. The control apparatus 1 can thus control the motion of the robot device 2. The control apparatus 1 can obtain, through the external interface 13, pressure data 121 indicating the detection values of the compressed air pressure detected by the pressure sensor 32 in time series and trajectory data 123 indicating the trajectory T of the suction head 30 during its rotational movement.

The configuration for controlling the robot device 2 and the configuration for obtaining the various items of data are not limited to the above examples, and may be determined as appropriate in each embodiment. For example, for the control apparatus 1 and the robot device 2 each including a communication interface, the control apparatus 1 may be connected to the robot device 2 through the communication interface. When another information processor (e.g., another controller) is connected to the robot device 2, the control apparatus 1 may be connected to the robot device 2 through the other information processor. The control apparatus 1 may obtain the pressure data 121 and the trajectory data 123 through such connections.

The input device 14 is, for example, a mouse or a keyboard. The output device 15 is, for example, a display or a speaker. An operator may operate the control apparatus 1 using the input device 14 and the output device 15.

The drive 16 is, for example, a compact disc (CD) drive or a digital versatile disc (DVD) drive for reading a program stored in a storage medium 91. The type of drive 16 may be selected as appropriate for the type of storage medium 91. The control program 81 may be stored in the storage medium 91.

The storage medium 91 stores programs or other information in an electrical, magnetic, optical, mechanical, or chemical manner to allow a computer or another device or machine to read the recorded programs or other information. The control apparatus 1 may obtain the control program 81 from the storage medium 91.

In FIG. 3, the storage medium 91 is a disc storage medium, such as a CD or a DVD. However, the storage medium 91 is not limited to a disc. One example of the storage medium other than a disc is a semiconductor memory such as a flash memory.

For the specific hardware configuration of the control apparatus 1, components may be eliminated, substituted, or added as appropriate in each embodiment. For example, the control unit 11 may include multiple hardware processors. Each hardware processor may include a microprocessor, a field-programmable gate array (FPGA), a digital signal processor (DSP), or other processors. The storage 12 may be the RAM and the ROM included in the control unit 11. At least one of the external interface 13, the input device 14, the output device 15, or the drive 16 may be eliminated. The control apparatus 1 may include multiple computers. In this case, each computer may have the same or a different hardware configuration. The control apparatus 1 may also be an information processing apparatus dedicated to an intended service, or may be a general-purpose personal computer (PC).

Robot

Figure 4:
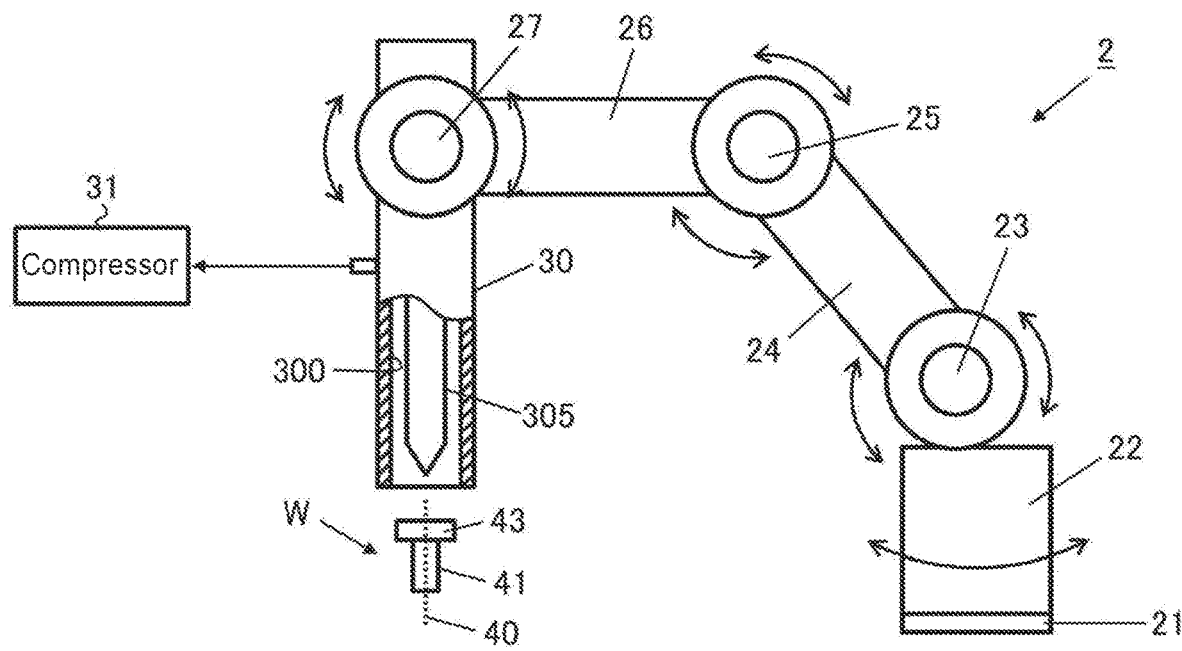
FIG. 4 is a schematic diagram illustrating an example robot device in one or more embodiments.

The hardware configuration of the robot device 2 in the present embodiment will now be described with reference to FIG. 4. FIG. 4 is a schematic diagram of the robot device 2 in the present embodiment showing its hardware configuration.

The robot device 2 in the present embodiment is a vertically articulated industrial robot with a base 21 and four joints (22, 23, 25, 27). Each of the joints (22, 23, 25, 27) incorporates a servomotor (not shown) and is rotatable about its axis. The first joint 22 is connected to the base 21 and has its distal end rotatable about the axis of the base. The second joint 23 is connected to the first joint 22 and has its distal end rotatable in the back-forth direction. The third joint 25 is connected to the second joint 23 with a link 24 and has its distal end rotatable vertically. The fourth joint 27 is connected to the third joint 25 with a link 26 and has its distal end rotatable vertically.

Each of the joints (22, 23, 25, 27) further incorporates an encoder (not shown). The encoder measures the angle of the corresponding one of the joints (22, 23, 25, 27). The encoder may be of any type selected as appropriate in each embodiment. The measurement values from the encoder are used to control the angle of each joint (22, 23, 25, 27). The angle of each joint (22, 23, 25, 27) may be controlled in any manner selected as appropriate in each embodiment. Each joint (22, 23, 25, 27) may be controlled with a known method such as proportional-integral-derivative (PID) control and PI control. The transformation between the angle of each joint (22, 23, 25, 27) and the position of the suction head 30 may be performed based on forward kinematics and inverse kinematics.

The fourth joint 27 receives the suction head 30 attached to its distal end. The suction head 30 has an internal space 300 (hollow section) open at the distal end. The compressor 31 is connected to the internal space 300. The suction head 30 is thus fed with compressed air from the compressor 31 to the internal space 300 and can pick up an object (workpiece W) at the open end.

In the present embodiment, the task to be performed by the robot device 2 is to attach a screw into an object (described later in detail). The workpiece W in the present embodiment is thus a screw. The robot device 2 in the present embodiment further includes a screwdriver 305 to rotate the screw sucked to the suction head 30 about the axis of the screw. In the present embodiment, the screwdriver 305 is incorporated in the internal space 300 of the suction head 30 and includes a shaft extending along the axis and a motor (not shown) for rotating the shaft about its axis. The tip of the shaft is shaped appropriately to engage with a screw.

The workpiece W in the present embodiment is a screw having an axis 40. The screw includes a shaft 41 extending along the axis 40 and a head 43 at one end of the shaft 41. The shaft 41 has, at least on a portion of its side surface, a spiral groove to be an external thread (not shown). The head 43 has a larger diameter than the shaft 41. The head 43 has a drive (not shown) on its surface to engage with the tip of the screwdriver 305. The screw may be attached to any object selected as appropriate in each embodiment.

The robot device 2 may include a controller (not shown). In this case, the control apparatus 1 may transmit a motion command to the controller to indirectly control the motion of the robot device 2. The controller may include a hardware processor and a memory. The controller may interpret the command from the control apparatus 1 to control the angle of each joint (22, 23, 25, 27). The controller may be a dedicated information processor or a general-purpose PC. In some embodiments, the control apparatus 1 may function as the controller in the robot device 2. In this case, the control apparatus 1 may control the angle of each joint (22, 23, 25, 27) to directly control the motion of the robot device 2. In the present embodiment, either configuration can be used to control the motion of the robot device 2 in the same manner. For ease of explanation, the robot device 2 Includes a controller in the example described below.

Task

The task performed by the robot device 2 will now be described with reference to FIGS. 5A to 5H. FIGS. 5A to 5H each schematically show the robot device 2 performing the task in one situation. In the present embodiment, the control apparatus 1 causes the robot device 2 to perform the task of holding the workpiece W (screw) fed at a predetermined position P1 and attaching the holding workpiece W to an object at a target position P2. The object may be of any type selected as appropriate in each embodiment.

Figure 5A:
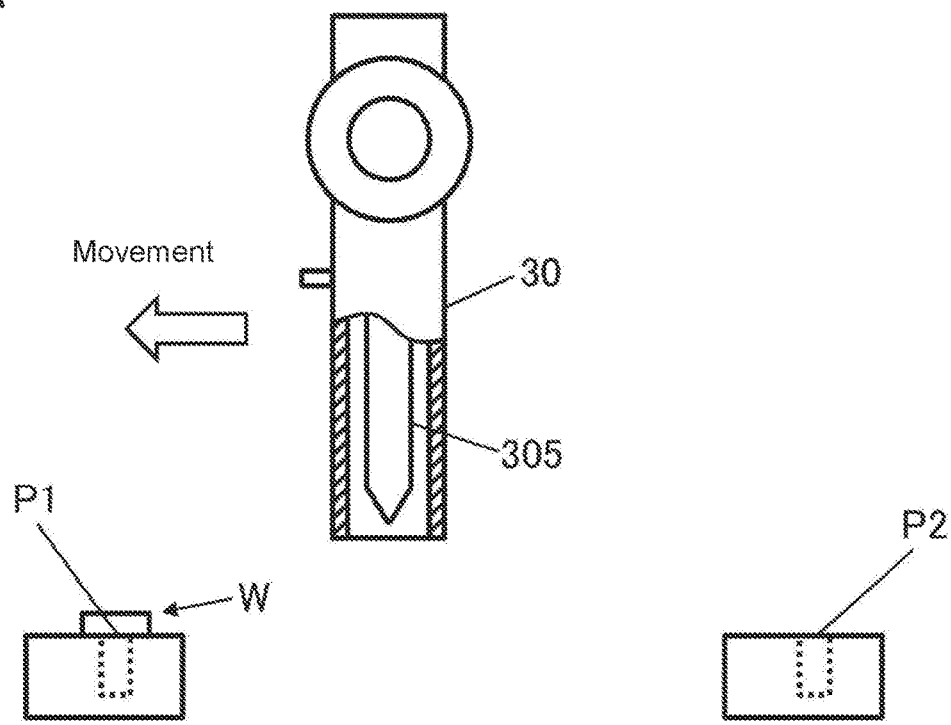
FIG. 5A is a diagram illustrating an example motion of a robot device in one or more embodiments.

As shown in FIG. 5A, the robot device 2 is first controlled to move the suction head 30 to the predetermined position P1 at which the workpiece W is fed. Before this motion, the suction head 30 may be at a reference position set as appropriate. In this case, the robot device 2 is controlled to move the suction head 30 from the reference position to the predetermined position P1. The workpiece W may be fed to the predetermined position P1 in any manner selected as appropriate in each embodiment. For example, the workpiece W may be fed using known equipment such as a conveyor.

Figure 5B:
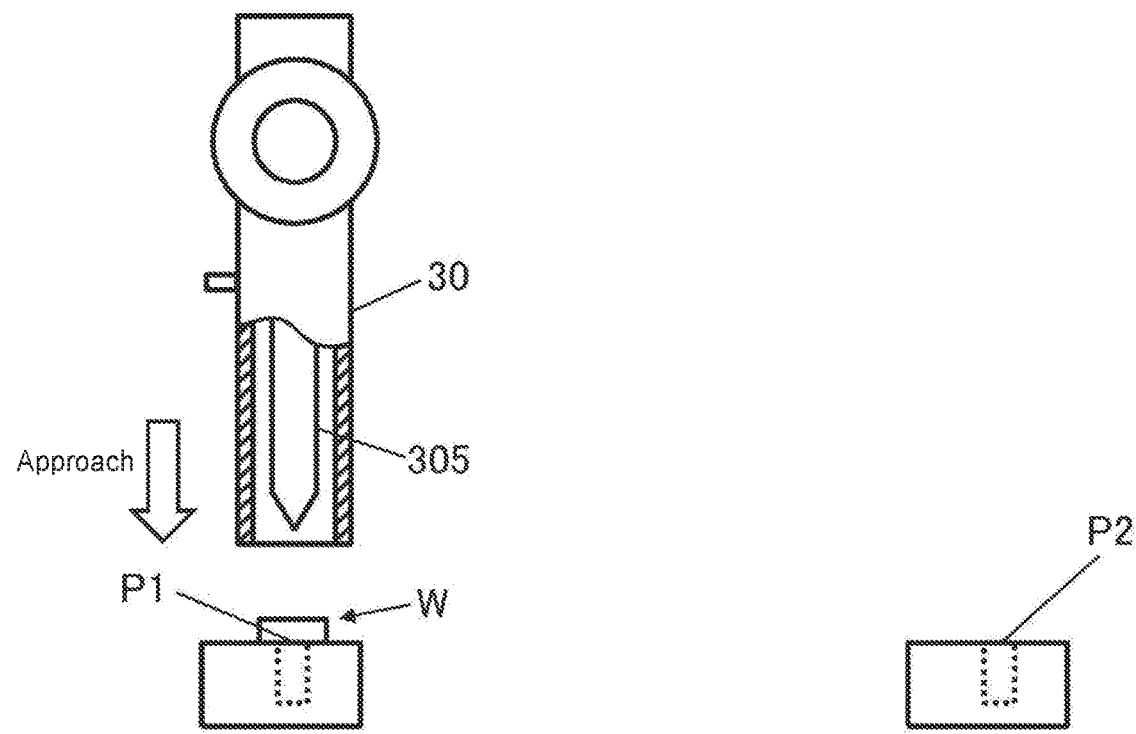
FIG. 5B is a diagram illustrating an example motion of a robot device in one or more embodiments.
Figure 5C:
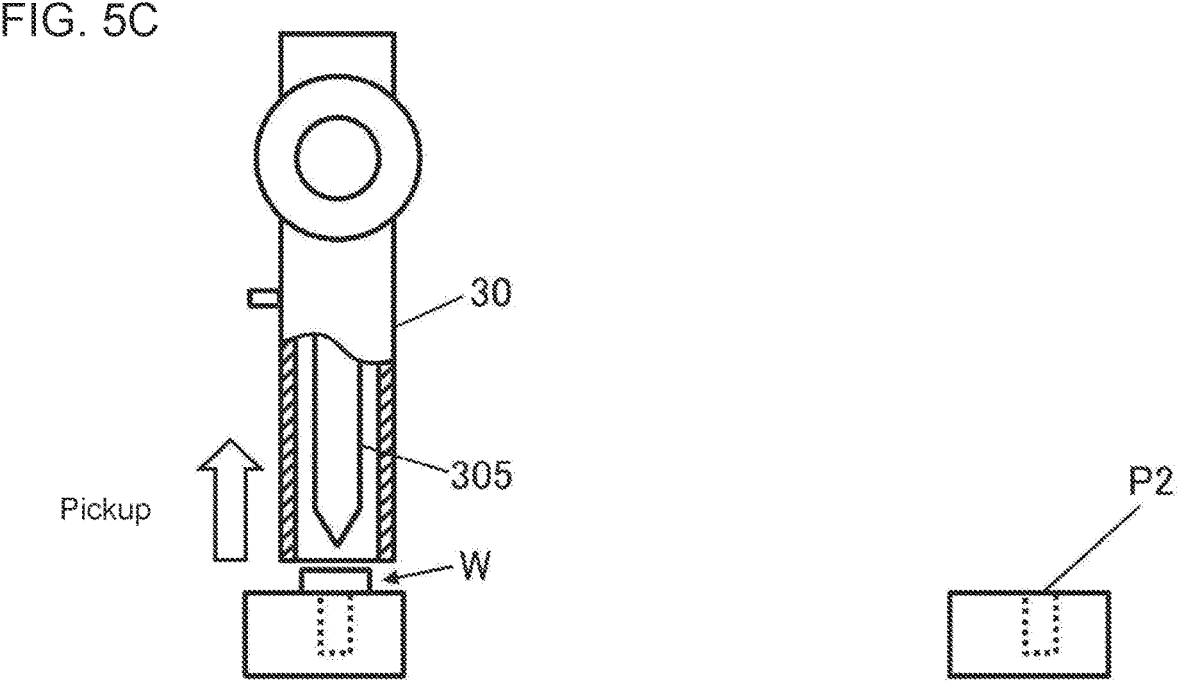
FIG. 5C is a diagram illustrating an example motion of a robot device in one or more embodiments.

In response to the suction head 30 reaching above the predetermined position P1, the robot device 2 is controlled to move the suction head 30 toward the predetermined position P1 from above, as shown in FIG. 5B. As shown in FIG. 5C, the robot device 2 is then controlled to attempt to pick up the workpiece W with the suction head 30 at the predetermined position P1. As the workpiece W is picked up, the tip of the screwdriver 305 in the suction head 30 may engage with the drive on the head 43 of the workpiece W. When the pickup of the workpiece W fails in this situation, the control apparatus 1 causes the robot device 2 to perform the above search motion.

Figure 5D:
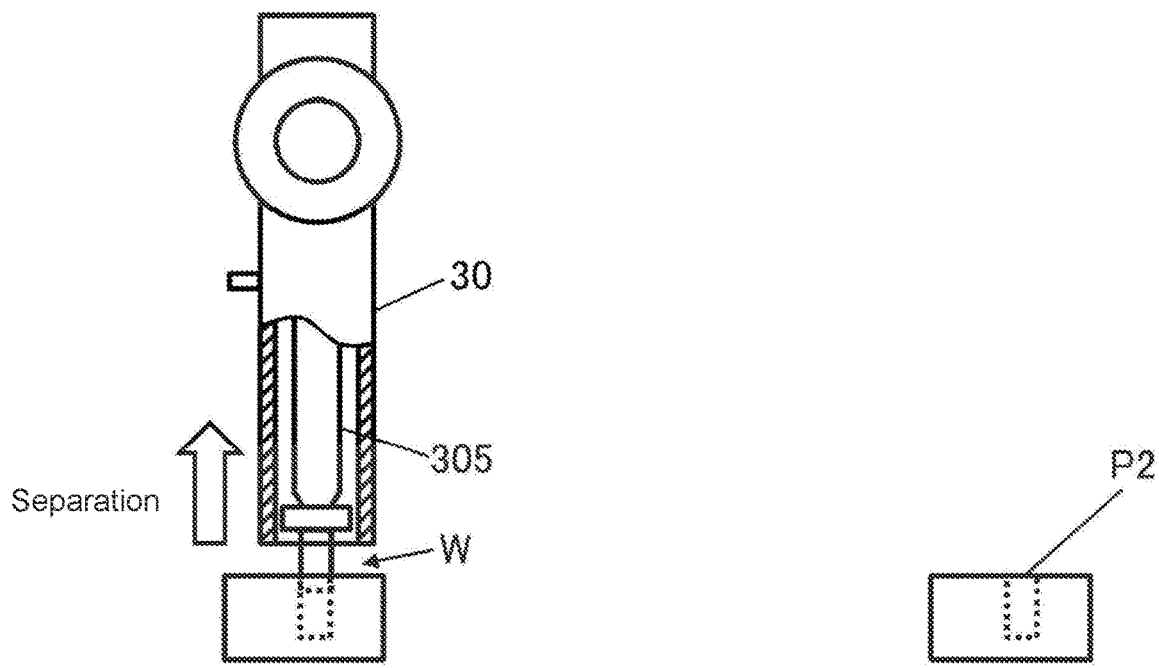
FIG. 5D is a diagram illustrating an example motion of a robot device in one or more embodiments.
Figure 5E:
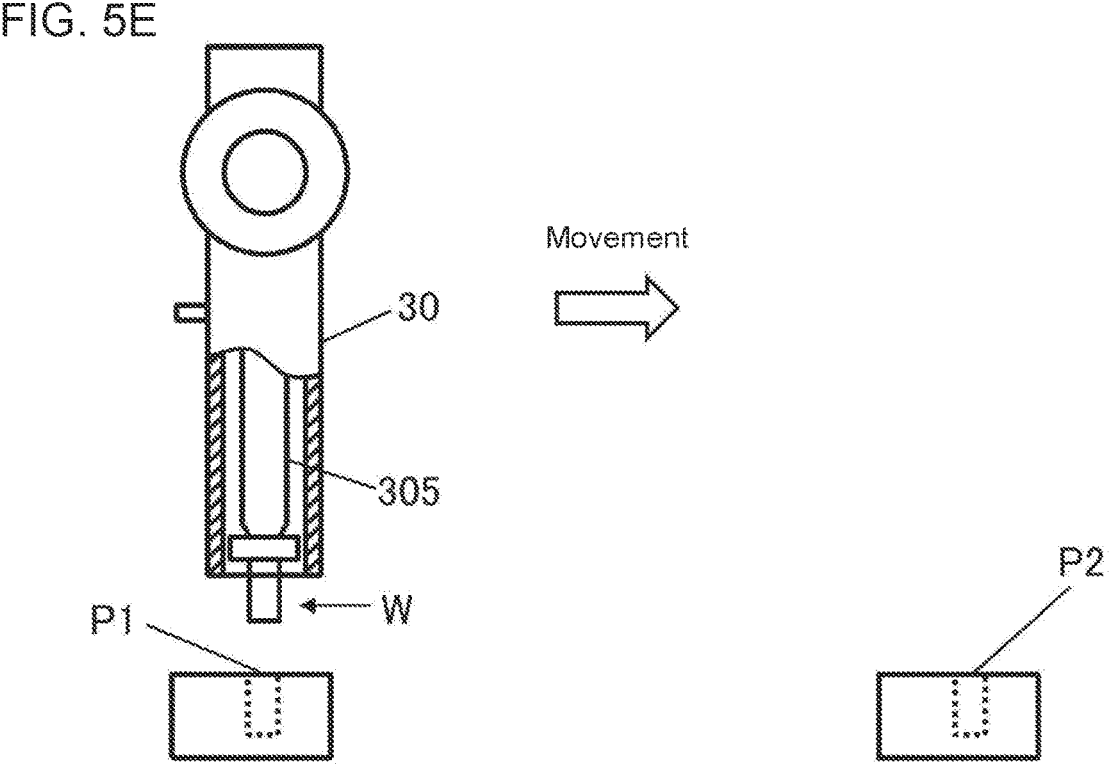
FIG. 5E is a diagram illustrating an example motion of a robot device in one or more embodiments.
Figure 5F:
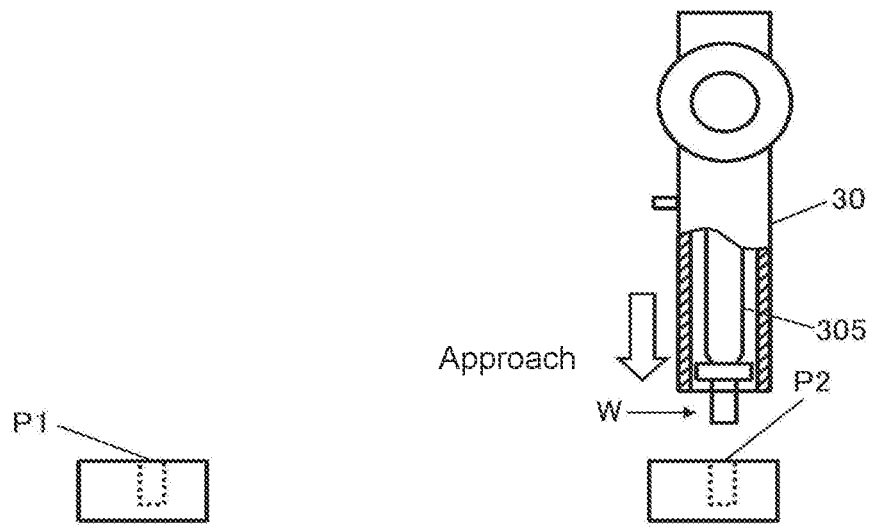
FIG. 5F is a diagram illustrating an example motion of a robot device in one or more embodiments.

After the suction head 30 picks up the workpiece W, the robot device 2 holding (sucking) the workpiece W is controlled to separate the suction head 30 from the predetermined position P1, as shown in FIG. 5D. As shown in FIG. 5E, the robot device 2 is then controlled to move the suction head 30 to transport the holding workpiece W to the target position P2. In response to the suction head 30 moving to above the target position P2, the robot device 2 is controlled to move the suction head 30 holding the workpiece W toward the target position P2 from above, as shown in FIG. 5F.

Figure 5G:
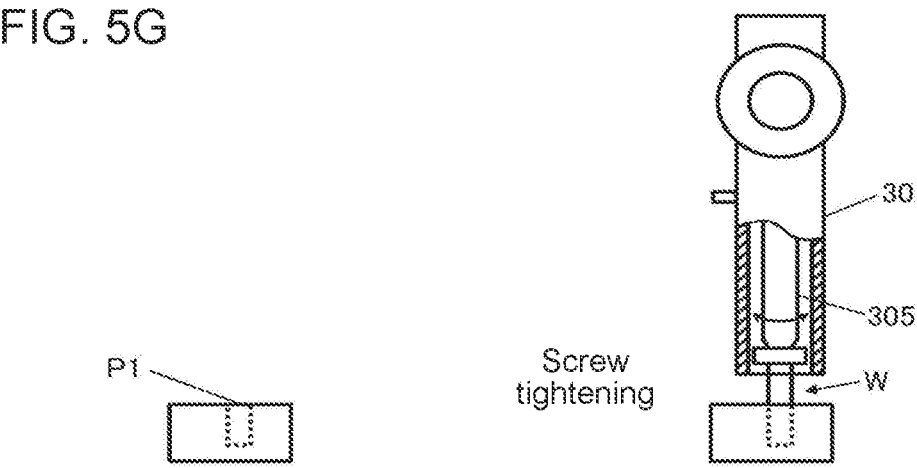
FIG. 5G is a diagram illustrating an example motion of a robot device in one or more embodiments.
Figure 5H:
FIG. 5H is a diagram illustrating an example motion of a robot device in one or more embodiments.

At the target position P2 on the object, a hollow extends with an end in one direction being open. At least a part of the inner surface defining the hollow has a spiral groove to be an internal thread (not shown). After the suction head 30 approaches the target position P2, the robot device 2 is controlled to activate the motor to rotate the screwdriver 305 about the axis for tightening the screw, as shown in FIG. 5G. The workpiece W is thus attached to the object at the target position P2, as shown in FIG. 5H. The series of tasks is then complete.

After the completion of the series of tasks, the robot device 2 may be controlled to stop sucking the workpiece W and move the suction head 30 to the reference position to perform the series of tasks in the next cycle. After the suction head 30 returns to the reference position, the robot device 2 may be controlled to perform the series of tasks in the next cycle with the same procedure as above.

Software Configuration
Control Apparatus

Figure 6:
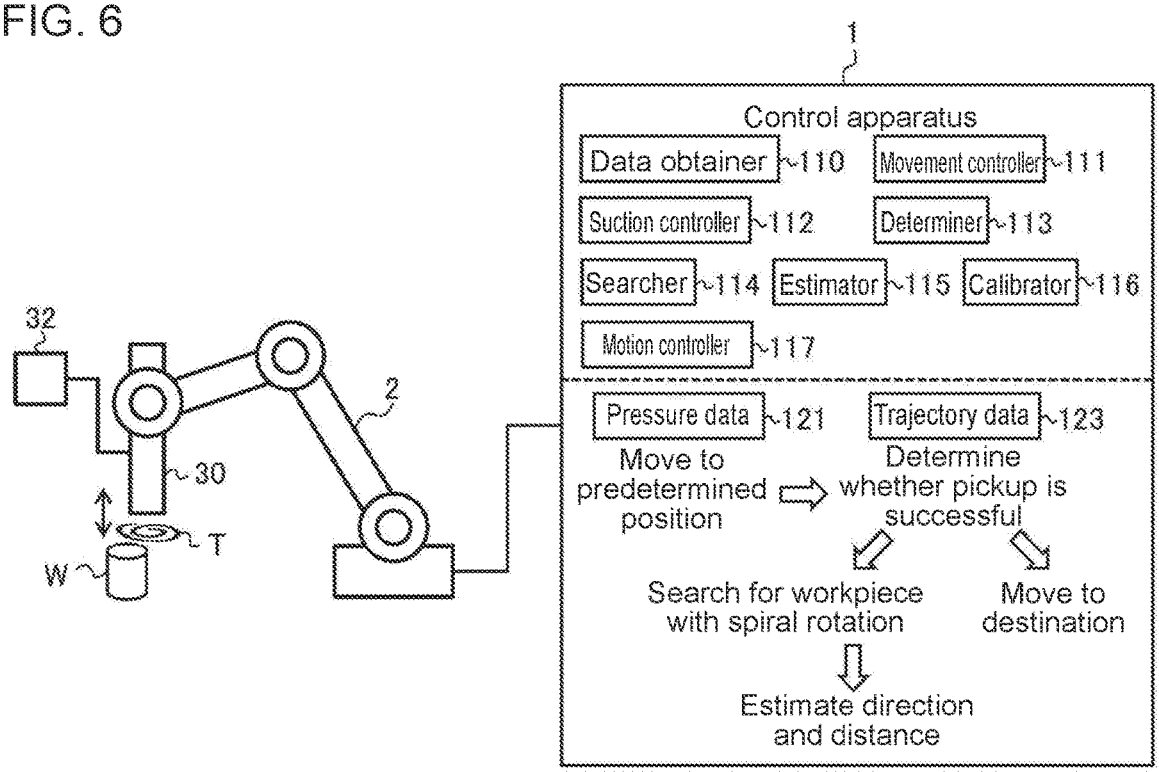
FIG. 6 is a schematic diagram illustrating a control apparatus according to one or more embodiments showing an example software configuration.

The software configuration of the control apparatus 1 according to the present embodiment will now be described with reference to FIG. 6. FIG. 6 is a schematic diagram of the control apparatus 1 according to the present embodiment showing its example software configuration.

The control unit 11 in the control apparatus 1 loads the control program 81 stored in the storage 12 into the RAM. The CPU in the control unit 11 then interprets and executes instructions included in the control program 81 loaded in the RAM to control each unit. As shown in FIG. 6, the control apparatus 1 according to the present embodiment thus operates as a computer including, as software modules, a data obtainer 110, a movement controller 111, a suction controller 112, a determiner 113, a searcher 114, an estimator 115, a calibrator 116, and a motion controller 117. In other words, in the present embodiment, each software module in the control apparatus 1 is implemented by the control unit 11 (CPU).

The data obtainer 110 obtains the pressure data 121 and the trajectory data 123 to monitor the state of the robot device 2 (suction head 30). The pressure data 121 is obtained by the pressure sensor 32. The trajectory T of the suction head 30 indicated by the trajectory data 123 may be derived from the detected angle values of each joint (22, 23, 25, 27) or from observation data obtained from other sensors (e.g., cameras) that observe the behavior of the suction head 30. The data obtainer 110 may obtain the pressure data 121 and the trajectory data 123 continuously or at limited time points or in limited periods.

The movement controller 111 causes the robot device 2 to move the suction head 30 to the predetermined position P1 at which the workpiece W is fed. The suction controller 112 causes the robot device 2 to attempt to pick up the workpiece W with the suction head 30 at the predetermined position P1. The determiner 113 determines whether the suction head 30 has picked up the workpiece W in the attempt by the suction controller 112 based on the detection result of the compressed air pressure from the pressure sensor 32. In response to the determination that the suction head 30 has picked up the workpiece W, the motion controller 117 causes the robot device 2 to perform intended processes shown in FIG. 5C and subsequent figures, such as moving the workpiece W held with the suction head 30 to an intended destination (target position P2).

In response to the determination that the suction head 30 has yet to pick up the workpiece W, the searcher 114 causes the robot device 2 to rotationally move the suction head 30 spirally in the horizontal direction while causing the suction head 30 to perform a suction operation for the workpiece W using compressed air. In this manner, the searcher 114 causes the robot device 2 to search for the true position of the workpiece W. The data obtainer 110 obtains the pressure data 121 and the trajectory data 123 in the period of this rotational movement. Rotationally moving the suction head 30 spirally in the horizontal direction refers to moving the suction head 30 along the spiral trajectory T on a horizontal plane as viewed in the vertical direction. The suction head 30 may be at any height (or more specifically, remain at the same height or move between different heights). In the present embodiment, the searcher 114 varies the position of the suction head 30 vertically for a calibration process described later.

The estimator 115 refers to the obtained pressure data 121 and trajectory data 123 and estimates the direction in which the workpiece W is located with respect to the predetermined position P1 based on the change in the compressed air pressure detected by the pressure sensor 32 during the rotational movement. In response to the determiner 113 determining that the suction head 30 has yet to pick up the workpiece W, the movement controller 111 causes the robot device 2 to further move the suction head 30 in the estimated direction. After the suction head 30 is moved further in the estimated direction, the suction controller 112 causes the robot device 2 to reattempt to pick up the workpiece W with the suction head 30.

When the pressure change at the distal end of the suction head 30 takes time to reach the pressure sensor 32, the pressure detection results (detected values) from the pressure sensor 32 may be delayed on the time axis from the point of search with the suction head 30. The calibrator 116 thus calibrates the detection results of the compressed air pressure from the pressure sensor 32 (i.e., the time series of detected pressure values indicated by the pressure data 121). The calibrator 116 thus fits the time axis of the pressure data 121 to the time axis of the trajectory data 123. This calibration process may be performed on the pressure data 121 obtained at least in the period of the rotational movement of the suction head 30 in the search for the workpiece W.

More specifically, the searcher 114 causes the robot device 2 to further displace the suction head 30 vertically while causing the suction head 30 to rotationally move spirally in the horizontal direction. Calibrating the detection results includes eliminating the difference between the variations in the compressed air pressure detected by the pressure sensor 32 during the vertical displacement of the suction head 30 and the variations in the compressed air expected based on the vertical displacement of the suction head 30.

The lowest point in the vertical movement is the position at which the suction head 30 is expected to be nearest the workpiece W. The highest point is the position at which the suction head 30 is expected to be farthest from the workpiece W. Thus, the variations in the compressed air pressure expected to occur based on the vertical displacement of the suction head 30 include, for example, variations such as a pressure detection value being the local maximum when the suction head 30 reaches the lowest point and a pressure detection value being the local minimum when the suction head 30 reaches the highest point. This may be set by the operator or others as appropriate in each embodiment. The calibrator 116 calibrates the time series of the pressure detection values by shifting the time axis of the pressure data 121 to eliminate the difference between the obtained variations of the pressure detection values and the above expected variations. The estimator 115 uses the calibrated results (pressure detection values) to estimate the direction in which the workpiece W is located with respect to the predetermined position P1.

In the present embodiment, the estimator 115 further estimates the distance between the predetermined position P1 and the position of the workpiece W based on the change in the compressed air pressure detected by the pressure sensor 32 during the rotational movement of the suction head 30. In response to the determiner 113 determining that the suction head 30 has yet to pick up the workpiece W, the movement controller 111 causes the robot device 2 to further move the suction head 30 in the estimated direction by the estimated distance. After the suction head 30 is moved further in the estimated direction by the estimated distance, the suction controller 112 causes the robot device 2 to reattempt to pick up the workpiece W with the suction head 30.

Each software module in the control apparatus 1 will be described in detail in the operation example described below. In the present embodiment, each software module in the control apparatus 1 is implemented by a general-purpose CPU. However, some or all of the software modules may be implemented by one or more dedicated processors. For the software configuration of the control apparatus 1, software modules may be eliminated, substituted, or added as appropriate in each embodiment.

3. Operation Example

Figure 7:
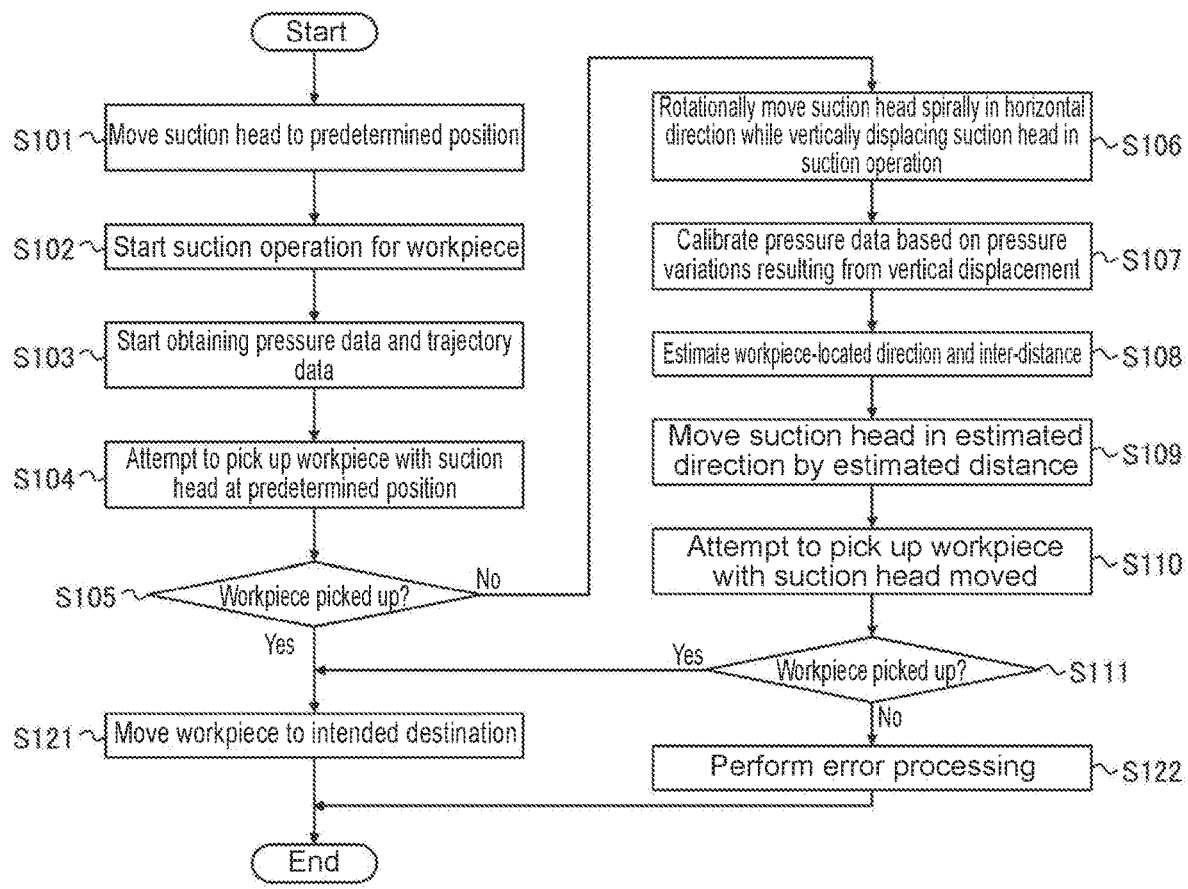
FIG. 7 is a flowchart illustrating a procedure performed by a control apparatus according to one or more embodiments.

An operation example of the control apparatus 1 will now be described with reference to FIG. 7. FIG. 7 is a flowchart of an example procedure performed by the control apparatus 1 according to the present embodiment for controlling the motion of the robot device 2. The procedure described below is an example of a control method in an aspect of the present invention. The procedure described below is a mere example, and each of its steps may be modified in any possible manner. In the procedure described below, steps may be eliminated, substituted, or added as appropriate in each embodiment.

Step S101

In step S101, the control unit 11 operates as the movement controller 111 and causes the robot device 2 to move the suction head 30 to the predetermined position P1 at which the workpiece W is fed.

The position of the suction head 30 at the start of the operation and the manner of controlling the position of the suction head 30 are not limited and may be determined as appropriate in each embodiment. In one example, the suction head 30 may be at a reference position at the start of the operation. In this example, the control unit 11 may provide a command to the robot device 2 to move the suction head 30 from the reference position to the predetermined position P1. The control unit 11 thus causes the robot device 2 to move the suction head 30 to the predetermined position P1 at which the workpiece W is fed, as shown in FIG. 5A. After moving the suction head 30 to the predetermined position P1, the control unit 11 advances the process to subsequent step S102.

Step S102

In step S102, the control unit 11 operates as the suction controller 112 and causes the robot device 2 to start the suction operation for the workpiece W with the suction head 30 at the predetermined position P1.

The manner of causing the robot device 2 to perform the suction operation may be determined as appropriate based on the structure of the robot device 2. In the present embodiment, the control unit 11 may provide a command to the robot device 2 to drive the compressor 31 for sucking the workpiece W with the suction head 30. The control unit 11 can thus cause the robot device 2 to start the suction operation for the workpiece W with the suction head 30 at the predetermined position P1, as shown in FIG. 5C.

The suction operation with the suction head 30 may be started at any time determined as appropriate in each embodiment. For example, the control unit 11 may cause the robot device 2 to start the suction operation for the workpiece W with the suction head 30 before or during the approaching motion shown in FIG. 5B. For example, the control unit 11 may cause the robot device 2 to start the suction operation for the workpiece W with the suction head 30 after the approaching motion shown in FIG. 5B. After causing the suction head 30 to start the suction operation for the workpiece W, the control unit 11 advances the process to subsequent step S103 while allowing the suction head 30 to continue the suction operation.

Step S103

In step S103, the control unit 11 operates as the data obtainer 110 to start obtaining the pressure data 121 and the trajectory data 123.

In the present embodiment, the control unit 11 can obtain the pressure data 121 from the pressure sensor 32 in the robot device 2. The control unit 11 can also derive the trajectory data 123 based on the observation data obtained by the encoders in the joints (22, 23, 25, 27) of the robot device 2. The pressure data 121 and the trajectory data 123 may be obtained through any other route selected as appropriate in each embodiment. For example, the pressure sensor 32 and the encoders may be connected to another computer. In this case, the control unit 11 may obtain the pressure data 121 and the trajectory data 123 from the other computer. After starting to obtain the pressure data 121 and the trajectory data 123, the control unit 11 advances the process to subsequent step S104.

Step S104

In step S104, the control unit 11 operates as the suction controller 112 and causes the robot device 2 to attempt to pick up the workpiece W with the suction head 30 at the predetermined position P1.

In the present embodiment, the control unit 11 causes the robot device 2 to perform the suction operation with the suction head 30 started in step S102 near the predetermined position P1 at which the workpiece W is fed, as shown in FIG. 5C. The control unit 11 can thus causes the robot device 2 to attempt to pick up the workpiece W with the suction head 30 at the predetermined position P1. After causing the suction head 30 to attempt to pick up the workpiece W, the control unit 11 advances the process to subsequent step S105.

Step S105

In step S105, the control unit 11 operates as the determiner 113 and determines whether the suction head 30 has picked up the workpiece W in the attempt in step S104 based on the detection result of the compressed air pressure from the pressure sensor 32.

The suction head 30 can pick up any workpiece W placed accurately at the predetermined position P1 in the attempt in step S104. In this case, the workpiece W is sucked at the open end of the suction head 30, causing the detection value of the compressed air pressure to be a predetermined value or greater. Thus, the control unit 11 may refer to the pressure data 121 and determine whether the suction head 30 has picked up the workpiece W depending on whether the detection value of the compressed air pressure is greater than or equal to a threshold. The threshold in the determination may be determined as appropriate.

In response to the detection value of the compressed air pressure being greater than or equal to the threshold, the control unit 11 determines that the suction head 30 has picked up the workpiece W. The control unit 11 then advances the process to subsequent step S121. In response to the detection value of the compressed air pressure being less than the threshold, the control unit 11 determines that the suction head 30 has yet to pick up the workpiece W. The control unit 11 then advances the process to subsequent step S106. For the detection value of the compressed air pressure being the same as the threshold, the determination may be performed in different manners. In the determination in step S105, being greater than or equal to may be replaced by being greater than, and being less than may be replaced by being less than or equal to.

Step S106

In step S106, the control unit 11 operates as the searcher 114 and causes the robot device 2 to rotationally move the suction head 30 spirally in the horizontal direction while causing the suction head 30 to perform the suction operation for the workpiece W using compressed air.

In the present embodiment, the control unit 11 causes the robot device 2 to further displace the suction head 30 vertically while causing the suction head 30 to rotationally move spirally in the horizontal direction. In other words, the control unit 11 causes the robot device 2 to displace the suction head 30 vertically and to rotationally move the suction head 30 spirally in the horizontal direction while causing the suction head 30 to perform the suction operation. The cycle for the vertical displacement may be set as appropriate in each embodiment. The vertical displacement may occur at constant or random intervals.

The amount of vertical displacement, the number of turns in the rotational movement, and the diameter of rotational movement are not limited to specific values, and may be determined as appropriate in each embodiment. In the present embodiment, the spiral rotational movement includes multiple turns each with a different diameter, as shown in FIG. 2. The motion for the rotational movement may be generated as appropriate with any known method such as direct teaching, use of a teaching pendant, or programming. In the present embodiment, the control unit 11 provides a command to the robot device 2 to indicate the generated motion for the rotational movement. The control unit 11 can thus cause the robot device 2 to displace the suction head 30 vertically and to rotationally move the suction head 30 spirally in the horizontal direction while causing the suction head 30 to perform the suction operation. After causing the robot device 2 to perform the motion for the rotational movement, the control unit 11 advances the process to subsequent step S107. The rotational movement may be started at the predetermined position P1 or at a position shifted from the predetermined position P1 by any distance in any direction. In the present embodiment described below, for ease of explanation, the rotational movement is started at the predetermined position P1.

Step S107

In step S107, the control unit 11 operates as the calibrator 116 and calibrates the detection results of the compressed air pressure from the pressure sensor 32, or more specifically, the time series of pressure detection values indicated by the pressure data 121 obtained during the rotational movement.

Figure 8:
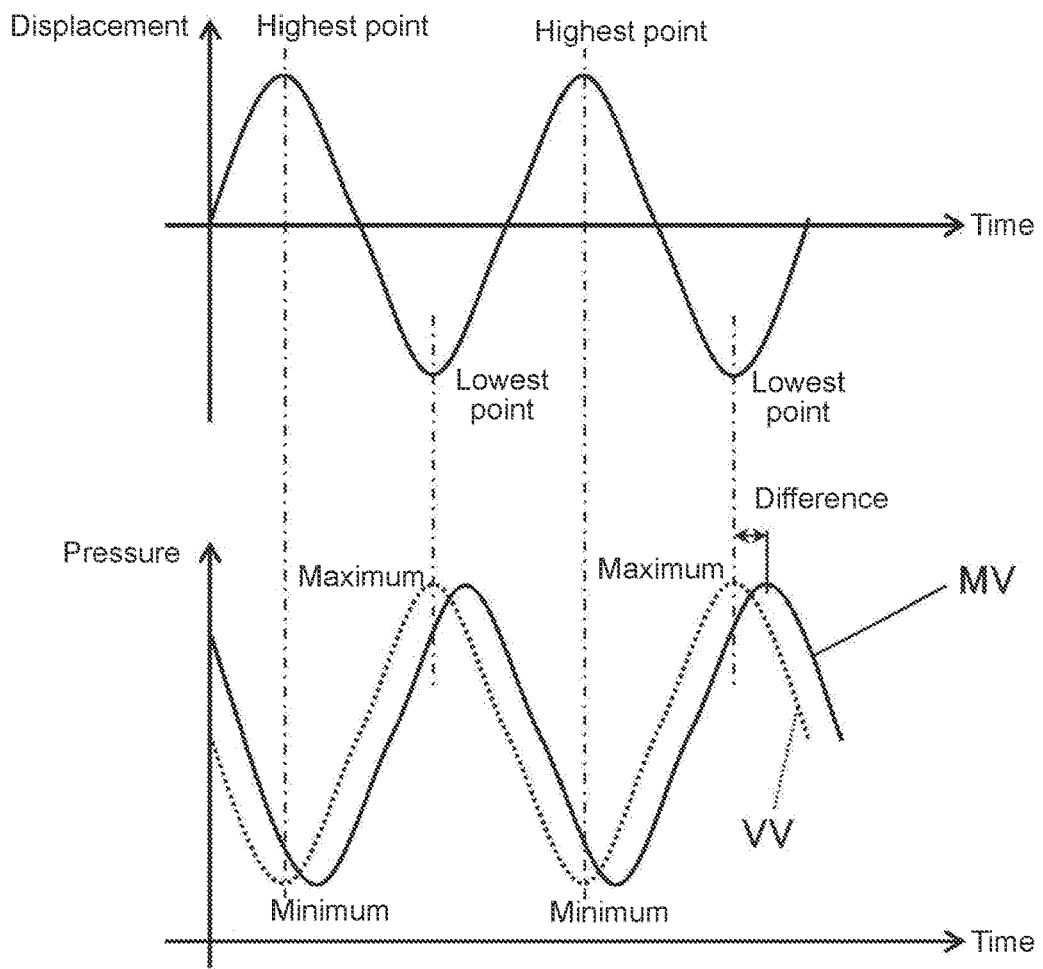
FIG. 8 is a set of graphs illustrating an example relationship between variations in compressed air pressure detected by a pressure sensor during vertical displacement of a suction head at a position and variations in compressed air pressure expected based on a vertical displacement of the suction head.

An example calibration manner will now be described with reference to FIG. 8. FIG. 8 schematically shows an example relationship between the variations in the compressed air pressure detected by the pressure sensor 32 during vertical displacement of the suction head 30 at a position and the variations in the compressed air pressure expected based on the vertical displacement of the suction head 30.

As shown in FIG. 8, in a normal state, the suction head 30 is expected to be nearest the workpiece W when reaching the lowest point and farthest from the workpiece W when reaching the highest point. Thus, the variations VV in the compressed air pressure expected to occur based on the vertical displacement of the suction head 30 include variations such as a pressure detection value being the local maximum when the suction head 30 reaches the lowest point and a pressure detection value being the local minimum when the suction head 30 reaches the highest point.

When the pressure change at the distal end of the suction head 30 takes time to reach the pressure sensor 32, the detection result (detected value) of the pressure from the pressure sensor 32 may be delayed on the time axis from the point of search performed by the suction head 30. In other words, the variations MV in the compressed air pressure detected by the pressure sensor 32 during the vertical displacement of the suction head 30 may shift from the expected variations VV in a direction delayed on the time axis. The control unit 11 thus shifts the time axis of the pressure data 121 to eliminate the difference between the detected pressure variations MV and the expected pressure variations VV to calibrate the time series of the pressure detection values. In one example, the control unit 11 may calibrate the time series of pressure detection values indicated by the pressure data 121 by aligning the times of detected pressure extremes with the times of expected pressure extremes. The extremes to be aligned may be at least the local maxima or the local minima. After calibrating the detection results of the compressed air pressure from the pressure sensor 32, the control unit 11 advances the process to subsequent step S108.

In the example in FIG. 8, for ease of explanation, the effect of the spiral rotational movement on the pressure detection results is not shown. However, the variations in the compressed air pressure based on the vertical displacement can occur in a manner superimposed on the variations in compressed air pressure based on spiral rotational movement. Thus, the effect of spiral rotational movement can be included to extract the variations based on the vertical displacement from the pressure detection results. The effect of spiral rotational movement can thus be included to calibrate the time series of the pressure detection values indicated by the pressure data 121 in the same manner as above.

Step S108

In step S108, the control unit 11 operates as the estimator 115 and refers to the pressure data 121 and the trajectory data 123 obtained during the rotational movement of the suction head 30 to estimate the direction in which the workpiece W is located with respect to the predetermined position P1 (hereafter simply referred to as a workpiece-located direction) based on a change in the compressed air pressure detected by the pressure sensor 32 during the rotational movement.

In the present embodiment, the estimator 115 further estimates the distance between the predetermined position P1 and the position of the workpiece W (hereafter simply referred to as inter-distance) based on a change in the compressed air pressure detected by the pressure sensor 32 during the rotational movement of the suction head 30. In the present embodiment, the control unit 11 uses the pressure data 121 calibrated in step S107 to estimate the workpiece-located direction and the inter-distance.

The suction head 30 nearer the true position of the workpiece W (in particular, the position at which the workpiece W can be stably picked up) allows detection of higher compressed air pressure, whereas the suction head 30 farther from the true position of the workpiece W allows detection of lower compressed air pressure. Any method based on this expectation may be used as appropriate to estimate the workpiece-located direction and the inter-distance based on changes in detected pressure.

In the example described below, for ease of explanation, the predetermined position P1 is the reference position for the workpiece-located direction and the inter-distance. Any deviation of the apparent reference position for the workpiece-located direction and the inter-distance from the predetermined position P1 may be accommodated by moving the suction head 30 by the distance corresponding to the deviation, allowing movement control to be performed in the same manner as for the predetermined position P1 at the reference position. Thus, the apparent reference position for the workpiece-located direction and the inter-distance may deviate from the predetermined position P1. The apparent reference position for the workpiece-located direction and the inter-distance may deviate from the predetermined position P1 by any distance in any direction. This point deviating from the predetermined position P1 by any distance in any direction may be the center of the rotational movement performed in step S106. For the center of rotational movement in step S106 at the predetermined position P1, the apparent reference position for the workpiece-located direction and the inter-distance may deviate from the predetermined position P1 by any distance in any direction.

(A) Method for Estimating Workpiece-Located Direction

An example method for estimating the workpiece-located direction will now be described. In the present embodiment, the control unit 11 divides the trajectory of the rotational movement indicated by the trajectory data 123 into multiple sections about the axis of the rotational movement. The control unit 11 then identifies one section of the multiple sections with the highest compressed air pressure (hereafter also referred to as a maximum pressure section) detected by the pressure sensor 32. The maximum pressure section may be identified in any manner determined as appropriate in each embodiment. For example, the control unit 11 may identify the maximum pressure section with at least one of the two methods described below.

The first method uses a detection point at which the pressure detection value is the highest. More specifically, the control unit 11 may extract the detection point with the highest compressed air pressure detected by the pressure sensor 32 and identify one section including the extracted detection point as the maximum pressure section. The second method uses the average of the pressure detection values. More specifically, the control unit 11 may calculate the average of the compressed air pressure values detected by the pressure sensor 32 for each section. The control unit 11 may identify one section of the multiple sections with the highest calculated pressure average as the maximum pressure section.

The control unit 11 then uses the direction in which the identified section is located with respect to the predetermined position P1 as the direction in which the workpiece W is located. Each section extends in an area defined by an angle (8 in FIG. 9 described later) about the axis. The control unit 11 can thus select the direction in which the identified section is located based on this angular range. In other words, the control unit 11 may use any direction included in the range of the identified section as the workpiece-located direction. For example, each section may have a predefined direction used as the workpiece-located direction when being identified as the maximum pressure section. The direction used as the workpiece-located direction may be, for example, the direction to bisect the angle for each section, the direction along the edge of each section, or any direction defined as appropriate. The direction used as the workpiece-located direction may be defined in the same or a different manner for each section. The direction used as the workpiece-located direction may be defined by an operator input or by a description in the control program 81. In this case, the control unit 11 can determine, based on the definition in the identified section, the workpiece-located direction in the identified section. For example, the control unit 11 may extract the detection point with the highest compressed air pressure (pressure detection value) detected in the identified section and use the direction connecting the extracted detection point and the center of the search (predetermined position P1) as the workpiece-located direction. In this manner, the control unit 11 can estimate the direction in which the workpiece W is located.

(B) Method for Estimating Inter-Distance

An example method for estimating the inter-distance will now be described. In the present embodiment, the spiral rotational movement performed in step S106 includes multiple turns each with a different diameter. Each turn is a rotational movement of 360 degrees about a central axis. The control unit 11 compares the compressed air pressure values detected by the pressure sensor 32 in different turns in the above identified section. The spiral rotational movement includes multiple turns, thus allowing pressure detection values to be obtained at two or more detection points with different distances to the center of the search in all directions of 360 degrees. The comparison of the pressure detection values obtained at the detection points in each direction indicates that the detected pressure value is the greatest at the true position of the workpiece W, particularly at the detection point corresponding to the position allowing stable pickup of the workpiece W, or at the detection point nearest the true position. The control unit 11 can thus estimate the distance between the predetermined position P1 and the position of the workpiece W based on the results of the comparison between the pressure values in different turns detected in the above identified section.

The inter-distance may be derived from the comparison between the pressure values in different turns detected in the identified section in any manner determined as appropriate in each embodiment. In one example, the comparison between the compressed air pressure values detected in different turns may include identifying one turn of the multiple turns with the highest compressed air pressure detected by the pressure sensor 32 in the identified section. The control unit 11 may estimate the inter-distance based on the diameter of one identified turn.

The inter-distance may be estimated based on the diameter of the identified turn in any manner determined as appropriate in each embodiment. For example, the control unit 11 may extract the detection point with the highest compressed air pressure (pressure detection value) detected in the identified section and turn. The control unit 11 may then directly use, as the inter-distance, the distance between the extracted detection point and the center of the search (predetermined position P1), or more specifically, the diameter of the turn at the extracted detection point.

However, the pressure detection values obtained by the search are local maxima, and the detection point with the highest detection value may not be the optimal position for picking up the workpiece W. In other words, the identified section may include a point at which pressure is higher than at the detection points at which pressure detection value is currently obtained. The control unit 11 may thus use, instead of the above method, a computational model to estimate the inter-distance based on the diameter of the identified turn. The computational model defines the relationship between the diameter of one identified turn and its inter-distance.

The computational model may be constructed as appropriate to allow calculation of the inter-distance. For example, the computational model may estimate the true inter-distance based on the pressure detection value and the distance to the detection point. This computational model may be represented with a functional formula or provided as a data table. For the computational model including a functional formula or a data table, pressure detection values are collected by causing the suction head to attempt to pick up the workpiece W at various positions to derive the relationship of the obtained detection values and the distances to the detection point with respect to the true inter-distances. This allows generation of the functional formula and data table for calculation of the inter-distance.

The computational model may be a machine learning model such as a linear regression model, a neural network, or a support vector machine. For the computational model including a machine learning model, pressure detection values are collected by causing the suction head to attempt to pick up the workpiece W at various positions. The obtained detection values and the distances to the detection point are associated with true inter-distances to generate training datasets. The generated training datasets are then used in machine learning to train the machine learning model to output a true inter-distance in response to an input of a pressure detection value and a distance to the detection point. Machine learning may be performed with a known method such regression analysis or backpropagation. In this manner, a trained machine learning model is generated for calculation of the inter-distance.

The computational model may be described in the control program 81 or stored in a predetermined storage area. The predetermined storage area may be the storage 12, the storage medium 91, an external storage, or a combination of any of these. The control unit 11 obtains the computational model as appropriate. The control unit 11 inputs the global maximum of the extracted detection values and the distance to the detection point in the identified section and turn into the computational model to perform computation of the computational model. The control unit 11 can thus obtain the inter-distance as an output from the computational model.

The computational model may receive any other input selected as appropriate. For example, the computational model may receive inputs of detection values and distances at multiple detection points in an identified workpiece-located direction. Either the detection value or the distance may not be input into the computational model. For example, the computational model may estimate the deviation of the detection point with the highest pressure detection value from the true position of the workpiece W based on the pressure detection value at the detection point. In this case, the control unit 11 may extract, based on the above comparison result, the detection point with the highest compressed air pressure (pressure detection value) detected in the identified section. The control unit 11 then inputs the pressure detection value at the extracted detection point into the computational model and perform the computation of the computational model. In this manner, the control unit 11 obtains the value of the deviation as the output from the computational model. The control unit 11 can calculate the inter-distance by adding the obtained deviation value to the diameter of the turn at the extracted detection point.

(C) Specific Example

Figure 9:
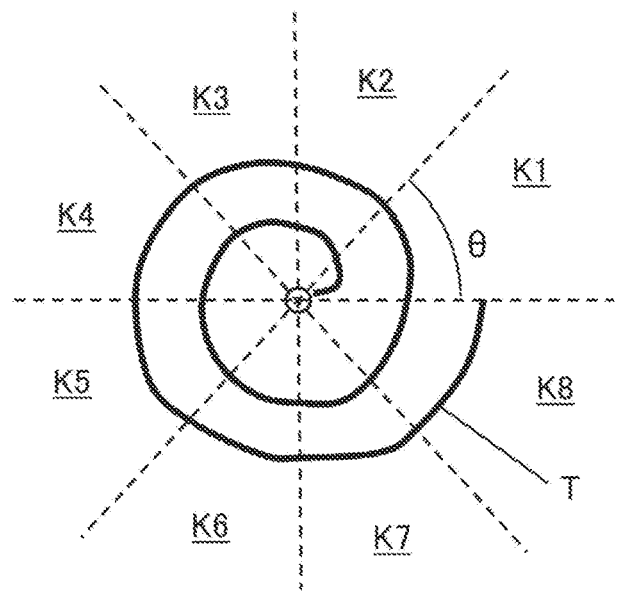
FIG. 9 is a schematic diagram illustrating an example relationship between a trajectory of a suction head and each section.
Figure 10:
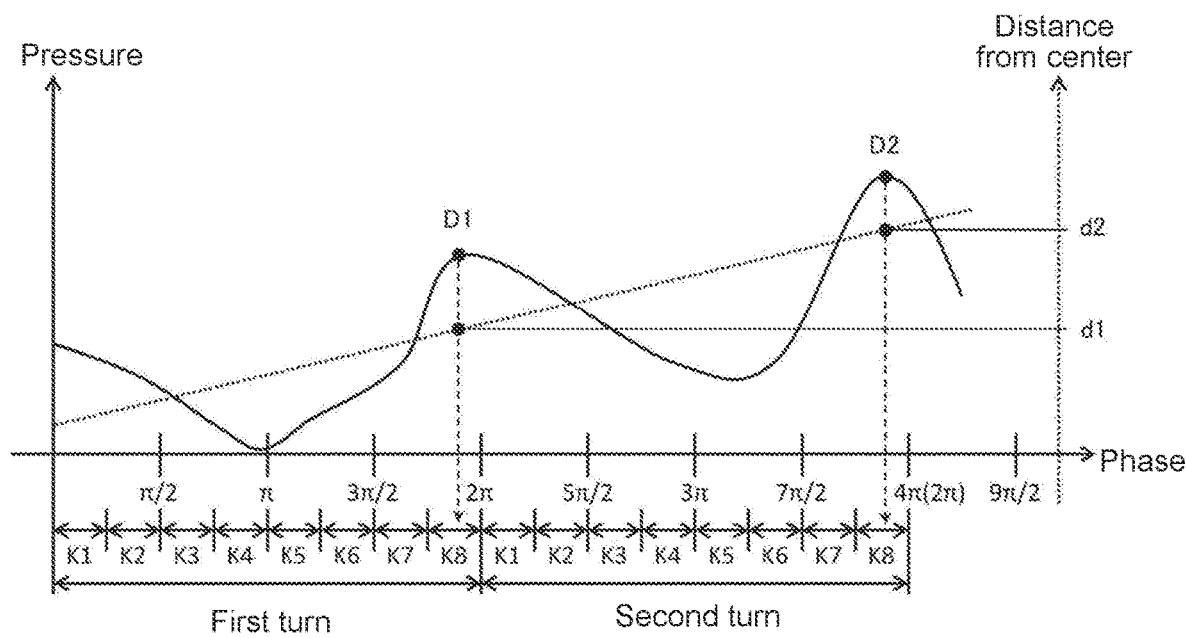
FIG. 10 is a graph illustrating example detected pressure (detection values).

A specific example of estimating the workpiece-located direction and the inter-distance in a situation will now be described with reference to FIGS. 9 and 10. FIG. 9 schematically shows an example relationship between the trajectory T of the suction head 30 and each of sections K1 to K8. FIG. 10 schematically shows example pressure detection values detected in the sections K1 to K8.

(1) Example of Estimating Workpiece-Located Direction

The control unit 11 first divides the trajectory T of the rotational movement into multiple sections (K1 to K8). In the example in FIGS. 9 and 10, for ease of explanation, the control unit 11 equally divides the trajectory T of the rotational movement into eight sections K1 to K8. Each of the sections K1 to K8 extends in an area defined by an angle θ of 45 degrees. The sections K1 to K8 are arranged in order of the suction head 30 passing through the sections during the rotational movement. For example, the section K1 extends in an area defined by a range of 0 to 45 degrees (¼π). The suction head 30 passes through the section K1 first in each turn. The section K8 extends in an area defined by a range of 315 (7/4π) to 360 degrees (2π). The suction head 30 passes through the section K8 last in each turn.

The estimation method may be used independently of the angle θ defining the area for each section. The trajectory T may thus be divided in a manner other than the above example. The trajectory T may be divided into, rather than eight, two to seven sections or nine or more sections. The trajectory T may not be divided equally. At least one of the sections may extend in an area defined by an angle different from the angle for the other sections. Each section may extend in an area defined by any angle θ set as appropriate in each embodiment.

The control unit 11 then identifies one section of the sections K1 to K8 with the highest compressed air pressure detected by the pressure sensor 32. In the example in FIGS. 9 and 10, the pressure detection value reaches the local maximum in the section K8, and the local maximum D2 of the pressure in the second turn is greater than the local maximum D1 of the pressure in the first turn. The average the pressure detection values is the greatest in the section K8 of the eight sections K1 to K8. When using the above first method to identify the maximum pressure section, the control unit 11 refers to the pressure data 121 and extracts the detection point at which the local maximum D2 is provided. The control unit 11 can identify the section K8 including the extracted detection point as the maximum pressure section. When using the above second method to identify the maximum pressure section, the control unit 11 calculates the average of the compressed air pressure values detected by the pressure sensor 32 for each of the sections K1 to K8. The control unit 11 can identify, of the eight sections K1 to K8, the section K8 with the highest calculated pressure average as the maximum pressure section.

The control unit 11 then uses the direction in which the identified section K8 is located with respect to the predetermined position P1 as the direction in which the workpiece W is located. For example, the control unit 11 may determine the workpiece-located direction within the angular range (315 to 360 degrees) defining the area for the section K8 based on predefined rules. For example, the control unit 11 may extract the detection point that provides the local maximum D1 or local maximum D2 and use the direction connecting the extracted detection point and the center of the search (predetermined position P1) as the workpiece-located direction. For the directions of the detection points providing the maxima being different in each turn, the control unit 11 may average the directions of the detection points and use the resultant direction as the workpiece-located direction. In the example in FIGS. 9 and 10, the workpiece-located direction is the direction that bisects the angle between the segment connecting the center of the search (the predetermined position P1) and the detection point that provides the local maximum D1 and the segment connecting the center of the search (the predetermined position P1) and the detection point that provides the local maximum D2.

(2) Example of Estimating Inter-Distance

In the example in FIGS. 9 and 10, the spiral rotational movement performed in step S106 includes two turns each with a different diameter. The control unit 11 compares the compressed air pressure values detected by the pressure sensor 32 in different turns in the section K8. The control unit 11 estimates the inter-distance based on the results of the comparison.

For example, the control unit 11 can determine, based on the comparison result between the pressure detection values detected in different turns in the section K8, that the local maximum D2 in the second turn is greater than the local maximum D1 in the first turn. In other words, the control unit 11 can identify, of the two turns, the second turn as the turn with the highest pressure detected in the section K8. The control unit 11 may estimate the inter-distance based on the diameter of second turn.

In one example, the control unit 11 may extract the detection point that provides the local maximum D2 as the detection with the highest detected pressure. The control unit 11 may then directly use the diameter of the turn (distance d2) at the extracted detection point (i.e., the detection point that provides the local maximum D2) as the inter-distance.

In some embodiments, the control unit 11 may use the above computational model to calculate the inter-distance. In this case, the computational model may estimate the true inter-distance based on the local maximum pressure in the turn with the highest detected pressure and the distance to the detection point that provides local maximum pressure. The control unit 11 inputs the local maximum D2 and distance d2 into the computational model to perform the computation of the computational model. The control unit 11 can thus obtain the inter-distance as an output from the computational model.

In another example, the computational model may estimate the true inter-distance based on each local maximum pressure values obtained in one identified section and the distance to the detection point providing each local maximum. In this case, the control unit 11 inputs each local maximum (D1, D2) and the distance (d1, d2) to each detection point into the computational model to perform computation of the computational model. The control unit 11 can thus obtain the inter-distance as an output from the computational model.

In still another example, the computational model may estimate the deviation of the detection point with the highest pressure detection value from the true position of the workpiece W based on the pressure detection value at the detection point. In this case, the control unit 11 inputs the local maximum D2 and the distance d2 into the computational model to perform the computation of the computational model. In this manner, the control unit 11 obtains the value of the deviation as the output from the computational model. The control unit 11 can calculate the inter-distance by adding the obtained deviation value to the distance d2.

(D) Brief Summary

In the manner described above, the control unit 11 can estimate the workpiece-located direction and the inter-distance based on a change in the compressed air pressure detected by the pressure sensor 32 during the rotational movement of the suction head 30. After estimating the workpiece-located direction and the inter-distance, the control unit 11 advances the process to step S109.

Step S109

In step S109, the control unit 11 operates as the movement controller 111 and causes the robot device 2 to further move the suction head 30 in the estimated workpiece-located direction.

In the present embodiment, the inter-distance is further estimated. The control unit 11 thus causes the robot device 2 to further move the suction head 30 in the estimated workpiece-located direction by the estimated inter-distance. This further movement may be started at any point. The control unit 11 may instruct the robot device 2 to move the suction head 30 from the final point of the above rotational movement (search) or from the predetermined position P1 or the center of the search.

In the present embodiment, the control unit 11 provides a command to the robot device 2 to move the suction head 30 in the estimated workpiece-located direction with respect to the predetermined position P1 by the estimated inter-distance. The control unit 11 can thus cause the robot device 2 to further move the suction head 30. After causing the suction head 30 to further move in the estimated workpiece-located direction by the estimated inter-distance, the control unit 11 advances the process to subsequent step S110.

Step S110

In step S110, the control unit 11 operates as the suction controller 112 and causes the robot device 2 to reattempt to pick up the workpiece W with the suction head 30 at the position resulting from the operation performed in step S109. The control unit 11 may cause the pickup attempt in the same manner as in step S104 described above. After causing the suction head 30 to reattempt to pick up the workpiece W, the control unit 11 advances the process to subsequent step S111.

Step S111

In step S111, the control unit 11 operates as the determiner 113 and determines whether the suction head 30 has picked up the workpiece W in the attempt in step S110 based on the detection result of the compressed air pressure from the pressure sensor 32. The control unit 11 may determine whether the suction head 30 has picked up the workpiece W in the same manner as in step S105 described above. After determining that the suction head 30 has picked up the workpiece W, the control unit 11 advances the process to subsequent step S121. After determining that the suction head 30 has yet to pick up the workpiece W, the control unit 11 advances the process to subsequent step S122.

Step S121

The operation in step S121 is performed in response to the workpiece W being picked up by the suction head 30. In step S121, the control unit 11 operates as the motion controller 117 and causes the robot device 2 to perform intended operations shown in FIG. 5C and subsequent figures, such as moving the workpiece W held with the suction head 30 to an intended destination (target position P2).

The motions in the intended operations may be generated as appropriate with any known method such as direct teaching, use of a teaching pendant, or programming. In the present embodiment, the control unit 11 provides a command to the robot device 2 to indicate the generated motions for the intended operations. The control unit 11 can thus cause the robot device 2 to perform the motions for the intended operations such as transporting the workpiece W to a destination. After the motions in the intended operations are complete, the control unit 11 ends the series of operations associated with this operation example. After ending the series of operations, the control unit 11 may repeat the process again from step S101 to cause the robot device 2 to perform the series of tasks in the next cycle.

Step S122

The operation in Step S122 is performed in response to the workpiece W not being picked up with the suction head 30 after the series of search operations performed in steps S106 to S110. In step S122, the control unit 11 performs error processing.

The error processing may be set as appropriate. For example, the error processing may include skipping the series of tasks to be performed. In this case, the control unit 11 skips picking up the workpiece W and the operations in the subsequent steps. For example, the control unit 11 may stop controlling the motion of the robot device 2 as the error processing. In this case, the control unit 11 may immediately stop controlling the motion of the robot device 2 or first causes the robot device 2 to perform a predetermined motion such as returning the suction head 30 to the reference position and then immediately stop controlling the motion of the robot device 2.

The error processing may also include outputting a notification to the operator, worker, supervisor, or other intended target persons to inform them that the pickup of the workpiece W has been unsuccessful. The notification may be output to any destination selected as appropriate in each embodiment. For example, the control unit 11 may output a notification through the output device 15 to inform the target person that the pickup of the workpiece W has been unsuccessful. For example, the control unit 11 may output a notification to, for example, a terminal carried by the target person or an output device (a display, a speaker, or an indicator lamp) near the target person to inform that the pickup of the workpiece W has been unsuccessful.

After performing the error processing, the control unit 11 ends the series of operations associated with this operation example. For the error processing being skipping the series of tasks to be performed, the control unit 11 after ending the series of operations may repeat the process again from step S101 to cause the robot device 2 to perform the series of tasks in the next cycle.

After repeating the series of operations in steps S106 to S111, the control unit 11 may perform the error processing in current step S122. In this case, the control unit 11 may count the number of times the series of operations in steps S106 to S111 is repeated. In response to determining in step S111 that the suction head 30 has yet to pick up the workpiece W, the control unit 11 may determine whether the count is greater than or equal to (or exceeds) a predetermined value. The predetermined value may be set as appropriate. In response to the count being less than the predetermined value, the control unit 11 returns to the process to step S106 and repeats the operations in steps S106 to S111. In response to the count being greater than or equal to the predetermined value, the control unit 11 may perform the error processing in current step S122.

Features

As described above, in the present embodiment, the spiral rotational movement of the suction head 30 in step S106 can reduce the likelihood of any direction with respect to the predetermined position P1 being unsearched for the workpiece W. In the present embodiment, the spiral rotational movement includes multiple turns, thus eliminating any direction with respect to the predetermined position P1 being unsearched for the workpiece W. The search for the workpiece W in step S106 is performed by controlling the relatively simple motion of the spiral rotational movement of the suction head 30. The structure in the present embodiment thus allows easy and appropriate estimation of the position at which the suction head 30 can stably pick up any workpiece W deviating from the predetermined position P1. This increases the productivity of the robot device 2. In the present embodiment, the structure increases the productivity of the robot device 2 that performs the process of turning screws.

In the present embodiment, the control unit 11 in step S108 divides the trajectory T of the rotational movement into multiple sections (K1 to K8) and identifies, from the resultant sections (K1 to K8) the section with the highest pressure detection value to estimate the direction in which the workpiece W is located. The control unit 11 also estimates the inter-distance based on the comparison between the pressure values detected in different turns in the identified section. In the present embodiment, the control unit 11 in step S106 further causes the robot device 2 to displace the suction head 30 vertically while causing the suction head 30 to rotationally move in a spiral shape. In step S107, the control unit 11 then calibrates, based on the motion in step S106, the time series of the pressure detection values indicated by the pressure data 121 obtained during the rotational movement of the suction head 30. The structure in the present embodiment with such features thus allows easy and appropriate estimation of the position at which the suction head 30 can stably pick up any workpiece W deviating from the predetermined position P1.

4. Modifications

The embodiment of the present invention described in detail above is a mere example of the present invention in all aspects. The embodiment may be variously modified or altered without departing from the scope of the present invention. For example, the embodiment may be modified in the following forms. In the modifications described below, like reference numerals denote like structural elements in the above embodiment, and such elements will not be described. The modifications described below may be combined as appropriate.

4.1

In the above embodiment, the workpiece W is a screw. However, the workpiece W may be of any type that can be held by sucking and selected as appropriate in each embodiment. The workpiece W may be, for example, a washer, other than a screw.

In the above embodiment, the robot device 2 includes the screwdriver 305 for rotating a screw about the axis. However, the robot device 2 may be structured in any manner different from this example. For the structure of the robot device 2, components may be eliminated, substituted, or added as appropriate in each embodiment. For example, the robot device 2 may include a sensor other than the encoder to observe the control quantity such as the angles of the joints (22, 23, 25, 27). For example, the robot device 2 may include other sensors to observe other attributes such as whether the suction head 30 is in contact with any object. The robot device 2 may have any number of axes other than in the above embodiment selected as appropriate in each embodiment.

In the above embodiment, the robot device 2 is a vertically articulated robot. However, the robot device 2 may be of any type that includes the suction head 30 and the pressure sensor 32 and may be selected as appropriate in each embodiment. The robot device 2 may be an industrial robot, such as a SCARA robot, a parallel link robot, a Cartesian coordinate robot, or a cooperative robot, other than a vertically articulated robot. The robot device 2 may be a known industrial robot.

In the above embodiment, an example task to be performed by the robot device 2 is screw installation. However, the task to be performed by the robot device 2 may be of any type that includes pickup of any workpiece with a suction head, other than screw installation. The task may be determined as appropriate in each embodiment. In another example, the robot device 2 may perform the task of placing a washer at a target position. In this case, the suction head 30 may include a Coanda gripper.

4.2

In the above embodiment, the spiral rotational movement includes two turns. However, the rotational movement may include any number of turns and angular range for the search determined as appropriate in each embodiment. The spiral rotational movement may include one or less than one turn, one to less than two turns, or more than two turns. The number of turns may be specified as appropriate with, for example, the operator's operation performed through the input device 14. For the spiral rotational movement including less than two turns, the control unit 11 may skip the comparison between different turns and estimate the inter-distance. In another example, the control unit 11 may skip estimating the inter-distance in step S108 described above.

4.3

In the present embodiment, the control unit 11 in step S108 divides the trajectory T of the rotational movement indicated by the trajectory data 123 into multiple sections (K1 to K8) about the axis of the rotational movement. The control unit 11 thus searches for the direction in which the workpiece W is located in each section (K1 to K8). However, the dividing operation may be skipped, and the workpiece W may be searched for in any unit set as appropriate.

With an example search method excluding dividing the direction into sections, the control unit 11 in step S108 described above may refer to the pressure data 121 and the trajectory data 123 obtained during the rotational movement of the suction head 30 and identify the detection point with the highest compressed air pressure detected by the pressure sensor 32. The control unit 11 may then use the direction in which the identified detection point is located with respect to the predetermined position P1 as the direction in which the workpiece W is located. In this manner, the control unit 11 can estimate the direction in which the workpiece W is located.

In this case, as in the above embodiment, the spiral rotational movement in step S106 may include multiple turns each with a different diameter. The control unit 11 may further estimate the inter-distance based on the distance between the predetermined position P1 and the identified detection point. As in the above embodiment, the control unit 11 may directly use the distance to the detection point as the inter-distance or derive an estimated distance based on the distance to the detection point using a computational model. In step S109, the control unit 11 may cause the robot device 2 to further move the suction head 30 in the estimated workpiece-located direction by the estimated inter-distance. In step S110, the control unit 11 may causes the robot device 2 to reattempt to pick up the workpiece W with the suction head 30 at the position resulting from the operation performed in step S109. This allows easy and appropriate estimation of the position at which the suction head 30 can stably pick up any workpiece W deviating from the predetermined position P1.

4.4

In the above embodiment, the control unit 11 in step S108 estimates the inter-distance as well as the workpiece-located direction. However, the estimation of the inter-distance may be skipped. In this case, the travel distance by which the suction head 30 is moved in step S109 may be determined as appropriate. For example, the travel distance may be set to a predetermined value. The predetermined value may be set with an input performed by, for example, the operator through the input device 14 or set in the control program 81.

Estimating the inter-distance in the above embodiment may include any computation that calculates the travel distance based on the pressure detection value and the detected point. In other words, any travel distance calculated based on the pressure detection value (and the detection point), including the distance not explicitly calculated as the inter-distance, may be used as the estimated inter-distance. With an example simple method for estimating the inter-distance, the control unit 11 may determine the travel distance based on the pressure detection value to reduce the travel distance for greater pressure detection values and increase the travel distance for less pressure detection values. The reference pressure detection value may be the local maximum or the global maximum in the detection range.

4.5

In the above embodiment, the control unit 11 in step S106 further causes the robot device 2 to displace the suction head 30 vertically while causing the suction head 30 to rotationally move spirally. In step S107, the control unit 11 then calibrates, based on the motion in step S106, the time series of the pressure detection values indicated by the pressure data 121 obtained during the rotational movement. However, the series of calibration operations may be skipped.

For example, the control unit 11 may skip the operation in step S107. In this case, the control unit 11 may instruct the robot device 2 to maintain the height of the suction head 30 constant during the rotational movement performed in step S106. In another example, the control unit 11 skipping step S107 may further causes the robot device 2 to displace the suction head 30 vertically while causing the suction head 30 to rotationally move spirally in step S106. In this case, the calibrator 116 may be eliminated from the software configuration of the control apparatus 1.

4.6

In the above embodiment, in step S103 and the subsequent steps, the control apparatus 1 obtains the pressure data 121 and the trajectory data 123. However, the pressure data 121 and the trajectory data 123 may be obtained in periods other than in the above example. The pressure data 121 may be obtained in any period that includes the period for the attempt of picking up the workpiece W and the period for the search performed in step S106. The period may be determined as appropriate in each embodiment. The trajectory data 123 may be obtained in any period that includes the period for the search performed in step S106. The period may be determined as appropriate in each embodiment. In the above procedure, upon determining in step S111 that the suction head 30 has yet to pick up the workpiece W, the control unit 11 may skip the operation in step S122 and repeat the process again from step S106.

The invention claimed is:

1. A control apparatus for controlling a motion of a robot device, the robot device comprising a suction head to pick up a workpiece using compressed air and a pressure sensor to detect pressure of the compressed air, the control apparatus comprising a processor configured with a program to perform operations comprising:
   operation as a movement controller configured to cause the robot device to move the suction head to a predetermined position at which the workpiece is fed;
   operation as a suction controller configured to cause the robot device to attempt to pick up the workpiece with the suction head at the predetermined position;
   operation as a determiner configured to determine whether the suction head has picked up the workpiece in the attempt based on a detection result of the pressure of the compressed air from the pressure sensor;
   operation as a searcher configured to cause, in response to determination that the suction head has yet to pick up the workpiece, the robot device to rotationally move the suction head spirally in a horizontal direction while causing the suction head to perform a suction operation for the workpiece using the compressed air; and
   operation as an estimator configured to estimate a direction in which the workpiece is located with respect to the predetermined position based on a change in the pressure of the compressed air detected by the pressure sensor during the rotational movement of the suction head,
   wherein the processor is configured with the program to perform operations such that
      in response to the determination that the suction head has yet to pick up the workpiece, operation as the movement controller comprises causing the robot device to further move the suction head in the estimated direction, and
      after the suction head is further moved in the estimated direction, operation as the suction controller comprises causing the robot device to reattempt to pick up the workpiece with the suction head.

2. The control apparatus according to claim 1, wherein the processor is configured with the program to perform operations such that
   operation as the estimator further comprises estimating a distance between the predetermined position and a position of the workpiece based on a change in the pressure of the compressed air detected by the pressure sensor during the rotational movement of the suction head,
   in response to the determination that the suction head has yet to pick up the workpiece, operation as the movement controller further comprises causing the robot device to further move the suction head in the estimated direction by the estimated distance, and
   after the suction head is further moved in the estimated direction by the estimated distance, operation as the suction controller further comprises causing the robot device to reattempt to pick up the workpiece with the suction head.

3. The control apparatus according to claim 1, wherein the processor is configured with the program to perform operations such that operation as the estimator configured to estimate the direction in which the workpiece is located further comprises:
   dividing a trajectory of the rotational movement into a plurality of sections about an axis of the rotational movement,
   identifying, of the plurality of sections, a section with a highest pressure of the compressed air detected by the pressure sensor, and
   using a direction in which the identified section is located with respect to the predetermined position as the direction in which the workpiece is located.

4. The control apparatus according to claim 3, wherein the processor is configured with the program to perform operations as the estimator such that identifying the section with the highest pressure of the compressed air comprises identifying a section comprising a detection point with a highest pressure of the compressed air detected by the pressure sensor.

5. The control apparatus according to claim 3, wherein the processor is configured with the program to perform operations as the estimator such that identifying the section with the highest pressure of the compressed air comprises
   calculating an average of pressure values of the compressed air detected by the pressure sensor for each of the plurality of sections, and
   identifying, of the plurality of sections, a section with a greatest calculated average of the pressure.

6. The control apparatus according to claim 3, wherein the spiral rotational movement comprises a plurality of turns each with a different diameter, and
   the processor is configured with the program to perform operations such that
      operation as the estimator further comprises estimating a distance between the predetermined position and a position of the workpiece based on comparison between pressure values of the compressed air detected by the pressure sensor in different turns of the plurality of turns in the identified section,
      in response to the determination that the suction head has yet to pick up the workpiece, operation as the movement controller comprises causing the robot device to further move the suction head in the estimated direction by the estimated distance, and
      after the suction head is further moved in the estimated direction by the estimated distance, operation as the suction controller comprises causing the robot device to reattempt to pick up the workpiece with the suction head.

7. The control apparatus according to claim 6, wherein the processor is configured with the program to perform operations such that operation as the estimator comprising estimating the distance between the predetermined position and the position of the workpiece based on the comparison between the pressure values of the compressed air detected by the pressure sensor in the different turns of the plurality of turns in the identified section comprises
  identifying, of the plurality of turns, a turn with a highest pressure of the compressed air detected by the pressure sensor in the identified section, and
  estimating the distance between the predetermined position and the position of the workpiece based on the diameter of the identified turn.

8. The control apparatus according to claim 1, wherein the processor is configured with the program to perform operations such that operation as the estimator configured to estimate the direction in which the workpiece is located further comprises:
  identifying a detection point with a highest pressure of the compressed air detected by the pressure sensor, and
  using a direction in which the identified detection point is located with respect to the predetermined position as the direction in which the workpiece is located.

9. The control apparatus according to claim 8, wherein the spiral rotational movement comprises a plurality of turns each with a different diameter, and
the processor is configured with the program to perform operations such that
  operation as the estimator further comprises estimating a distance between the predetermined position and a position of the workpiece based on a distance between the predetermined position and the identified detection point,
  in response to the determination that the suction head has yet to pick up the workpiece, operation as the movement controller comprises causing the robot device to further move the suction head in the estimated direction by the estimated distance, and
  after the suction head is further moved in the estimated direction by the estimated distance, operation as the suction controller comprises causing the robot device to reattempt to pick up the workpiece with the suction head.

10. The control apparatus according to claim 1, wherein the processor is configured with the program to perform operations further comprising operation as a calibrator configured to calibrate the detection result of the pressure of the compressed air from the pressure sensor, and
the processor is configured with the program such that
  operation as the searcher comprises causing the robot device to further displace the suction head vertically while causing the suction head to rotationally move spirally in the horizontal direction,
  operation as a calibrator configured to calibrate the detection result comprises eliminating a difference between variations in pressure of the compressed air detected by the pressure sensor during the vertical displacement of the suction head and variations in pressure of the compressed air expected based on the vertical displacement of the suction head, and
  operation as the estimator comprises using a calibrated result to estimate the direction in which the workpiece is located with respect to the predetermined position.

11. The control apparatus according to claim 1, wherein the workpiece comprises a screw, and
the robot device further comprises a screwdriver to rotate the screw sucked to the suction head about an axis of the screw.

12. The control apparatus according to claim 4, wherein the spiral rotational movement comprises a plurality of turns each with a different diameter, and
the processor is configured with the program to perform operations such that
  operation as the estimator further comprises estimating a distance between the predetermined position and a position of the workpiece based on comparison between pressure values of the compressed air detected by the pressure sensor in different turns of the plurality of turns in the identified section,
  in response to the determination that the suction head has yet to pick up the workpiece, operation as the movement controller comprises causing the robot device to further move the suction head in the estimated direction by the estimated distance, and
  after the suction head is further moved in the estimated direction by the estimated distance, operation as the suction controller comprises causing the robot device to reattempt to pick up the workpiece with the suction head.

13. The control apparatus according to claim 5, wherein the spiral rotational movement comprises a plurality of turns each with a different diameter, and
the processor is configured with the program to perform operations such that
  operation as the estimator further comprises estimating a distance between the predetermined position and a position of the workpiece based on comparison between pressure values of the compressed air detected by the pressure sensor in different turns of the plurality of turns in the identified section,
  in response to the determination that the suction head has yet to pick up the workpiece, operation as the movement controller comprises causing the robot device to further move the suction head in the estimated direction by the estimated distance, and
  after the suction head is further moved in the estimated direction by the estimated distance, operation as the suction controller comprises causing the robot device to reattempt to pick up the workpiece with the suction head.

14. The control apparatus according to claim 2, wherein the processor is configured with the program to perform operations further comprising operation as a calibrator configured to calibrate the detection result of the pressure of the compressed air from the pressure sensor, and
the processor is configured with the program such that
  operation as the searcher comprises causing the robot device to further displace the suction head vertically while causing the suction head to rotationally move spirally in the horizontal direction,
  operation as a calibrator configured to calibrate the detection result comprises eliminating a difference between variations in pressure of the compressed air detected by the pressure sensor during the vertical displacement of the suction head and variations in pressure of the compressed air expected based on the vertical displacement of the suction head, and
  operation as the estimator comprises using a calibrated result to estimate the direction in which the workpiece is located with respect to the predetermined position.

15. The control apparatus according to claim 3, wherein the processor is configured with the program to perform operations further comprising operation as a calibrator configured to calibrate the detection result of the pressure of the compressed air from the pressure sensor, and the processor is configured with the program such that
operation as the searcher comprises causing the robot device to further displace the suction head vertically while causing the suction head to rotationally move spirally in the horizontal direction,
operation as a calibrator configured to calibrate the detection result comprises eliminating a difference between variations in pressure of the compressed air detected by the pressure sensor during the vertical displacement of the suction head and variations in pressure of the compressed air expected based on the vertical displacement of the suction head, and
operation as the estimator comprises using a calibrated result to estimate the direction in which the workpiece is located with respect to the predetermined position.

16. The control apparatus according to claim 4, wherein the processor is configured with the program to perform operations further comprising operation as a calibrator configured to calibrate the detection result of the pressure of the compressed air from the pressure sensor, and
the processor is configured with the program such that
operation as the searcher comprises causing the robot device to further displace the suction head vertically while causing the suction head to rotationally move spirally in the horizontal direction,
operation as a calibrator configured to calibrate the detection result comprises eliminating a difference between variations in pressure of the compressed air detected by the pressure sensor during the vertical displacement of the suction head and variations in pressure of the compressed air expected based on the vertical displacement of the suction head, and
operation as the estimator comprises using a calibrated result to estimate the direction in which the workpiece is located with respect to the predetermined position.

17. The control apparatus according to claim 5, wherein the processor is configured with the program to perform operations further comprising operation as a calibrator configured to calibrate the detection result of the pressure of the compressed air from the pressure sensor, and
the processor is configured with the program such that
operation as the searcher comprises causing the robot device to further displace the suction head vertically while causing the suction head to rotationally move spirally in the horizontal direction,
operation as a calibrator configured to calibrate the detection result comprises eliminating a difference between variations in pressure of the compressed air detected by the pressure sensor during the vertical displacement of the suction head and variations in pressure of the compressed air expected based on the vertical displacement of the suction head, and
operation as the estimator comprises using a calibrated result to estimate the direction in which the workpiece is located with respect to the predetermined position.

18. The control apparatus according to claim 6, wherein the processor is configured with the program to perform operations further comprising operation as a calibrator configured to calibrate the detection result of the pressure of the compressed air from the pressure sensor, and
the processor is configured with the program such that
operation as the searcher comprises causing the robot device to further displace the suction head vertically while causing the suction head to rotationally move spirally in the horizontal direction,
operation as a calibrator configured to calibrate the detection result comprises eliminating a difference between variations in pressure of the compressed air detected by the pressure sensor during the vertical displacement of the suction head and variations in pressure of the compressed air expected based on the vertical displacement of the suction head, and
operation as the estimator comprises using a calibrated result to estimate the direction in which the workpiece is located with respect to the predetermined position.

19. A method for controlling a motion of a robot device, the robot device comprising a suction head to pick up a workpiece using compressed air and a pressure sensor to detect pressure of the compressed air, the method being implementable by a computer, the method comprising:
causing the robot device to move the suction head to a predetermined position at which the workpiece is fed;
causing the robot device to attempt to pick up the workpiece with the suction head at the predetermined position;
determining whether the suction head has picked up the workpiece in the attempt based on a detection result of the pressure of the compressed air from the pressure sensor;
in response to determination that the suction head has yet to pick up the workpiece,
causing the robot device to rotationally move the suction head spirally in a horizontal direction while causing the suction head to perform a suction operation for the workpiece using the compressed air;
estimating a direction in which the workpiece is located with respect to the predetermined position based on a change in the pressure of the compressed air detected by the pressure sensor during the rotational movement of the suction head;
causing the robot device to further move the suction head in the estimated direction; and
causing, after further moving the suction head in the estimated direction, the robot device to reattempt to pick up the workpiece with the suction head.

20. A non-transitory computer-readable storage medium storing a control program for controlling a motion of a robot device, the robot device comprising a suction head to pick up a workpiece using compressed air and a pressure sensor to detect pressure of the compressed air, the control program, when read and executed, causing a computer to perform operations comprising:
causing the robot device to move the suction head to a predetermined position at which the workpiece is fed;
causing the robot device to attempt to pick up the workpiece with the suction head at the predetermined position;
determining whether the suction head has picked up the workpiece in the attempt based on a detection result of the pressure of the compressed air from the pressure sensor;
in response to determination that the suction head has yet to pick up the workpiece,
causing the robot device to rotationally move the suction head spirally in a horizontal direction while causing the suction head to perform a suction operation for the workpiece using the compressed air;
estimating a direction in which the workpiece is located with respect to the predetermined position based on a change in the pressure of the compressed air detected by the pressure sensor during the rotational movement of the suction head;

causing the robot device to further move the suction head in the estimated direction; and causing, after further moving the suction head in the estimated direction, the robot device to reattempt to pick up the workpiece with the suction head.

* * * * *